(12) United States Patent
Cyriac

(10) Patent No.: US 12,733,594 B2
(45) Date of Patent: Sep. 15, 2026

(54) METHODS OF MATURING CANNABIS PLANTS

(71) Applicant: Febin Cyriac, Seffner, FL (US)

(72) Inventor: Febin Cyriac, Seffner, FL (US)

(73) Assignee: OLD WORLD CLASSIC INC, Seffner, FL (US)

( * ) Notice: Subject to any disclaimer, the term of this patent is extended or adjusted under 35 U.S.C. 154(b) by 73 days.

(21) Appl. No.: 18/796,485

(22) Filed: Aug. 7, 2024

(65) Prior Publication Data

US 2026/0041043 A1 Feb. 12, 2026

(51) Int. Cl.
*A01G 7/04* (2006.01)
*A01G 31/02* (2006.01)
*A01D 45/06* (2006.01)

(52) U.S. Cl.
CPC ............ *A01G 7/045* (2013.01); *A01G 31/02* (2013.01); *A01D 45/065* (2013.01)

(58) Field of Classification Search
CPC . A01G 22/00; A01G 7/02; A01G 7/04; A01G 7/045; A01G 9/249; A01D 45/065
See application file for complete search history.

(56) References Cited

U.S. PATENT DOCUMENTS

2012/0311744 A1 12/2012 Sirkowski
2016/0184237 A1* 6/2016 Lowe ...................... A01G 7/04 47/58.1 LS
2019/0191646 A1 6/2019 Whitton
2020/0337250 A1* 10/2020 Glover .................. A01G 22/00
2021/0259168 A1 8/2021 Dam
2021/0378194 A1* 12/2021 Leo ......................... A01G 9/20
2022/0295712 A1 9/2022 Nicole
2024/0008419 A1* 1/2024 Leo .......................... A23L 7/10
2024/0049670 A1 2/2024 Buxdorf et al.
2024/0065182 A1* 2/2024 Hall ...................... A01G 9/246
2024/0105278 A1* 3/2024 Maminakis ........... G16B 20/00

FOREIGN PATENT DOCUMENTS

EP 19189075 A1 2/2021
WO 2021168560 A1 2/2021
WO 2023161915 A2 8/2023

OTHER PUBLICATIONS

Christopher, "Cannabis Light Schedules: Vegetative Stage vs. Flowering Stage", Oct. 11, 2022.*
Joe et al., "Topping cannabis How to do it, when and why?", Jul. 29, 2024.*

(Continued)

*Primary Examiner* — Trinh T Nguyen
(74) *Attorney, Agent, or Firm* — James Rogers

(57) ABSTRACT

The invention relates to methods of maturing *Cannabis* plants. In some embodiments, the *cannabis* plants are matured until they have reached a defined height for an extended period of time during a vegetative stage in a defined sized container under a first light schedule prior to flowering. In some embodiments, the plant is started in a small container, and subsequently moved to a larger container. In some embodiments, a source of the *cannabis* plant for the propagation is a mother plant which is kept without flowering, the mother plant grown from a non-genetically modified (non-GMO) seed, and the mother plant has itself matured according to methods of the invention.

20 Claims, 2 Drawing Sheets

(56) References Cited

OTHER PUBLICATIONS

Bergman et al., “MH and HPS grow lights for marijuana”, Jun. 1, 2021.*

Agak et al., “How often should I water my Cannabis Plants During Flowering?”, Nov. 23, 2020.*

Robert et al., “Hydroponic marijuana growing indoors”, Aug. 8, 2021.*

Cato et al., “Cannabis Mother Plant Guide for Beginners”, May 10, 2023.*

Nebula Haze, “What is the Optimum Final Height for Cannabis Plants?” GrossWeedEasy, Issue #390—Sunday, Oct. 6, 2019, pp. 1-18, Retrieved from the Internet; <URL: https://growweedeasy.optin.com/newsletter/gwe-updates/ODk1MTM2NQ==/gwe-what-is-the-optimum-final-height-for-cannabis-plants.htm.

Levi Lanzrath, “Does THC Percentage Matter? Cannabis Experts Weigh in” LowTemp Industries, Oct. 25, 2023, Retrieved from the Internet; <URL:https://www.lowtemp-plates.com/blogs/knowledge/does-thc-percentage-matter.

Jess Cockerill, “First-of-Its-Kind Experiment Confirms The Best Cannabis Compound for Anxiety” Health, Mar. 2, 2024, pp. 1-3, Retrieved from the Internet; <URL: https://www.sciencealert.com/first-of-its-kind-experiment-confirms-the-best-cannabis-compound-for-anxiety.

Kostas Loahnids et al., “An Alternative In Vitro Propagation Protocol of *Cannabis sativa* L. (Cannabaceae) Presenting Efficient Rooting for Commercial Production” Plants 2022, 11, 1333, pp. 1-17.

Robert N. Phalen, “Cannabis” Patty’s Industrial Hygiene, Edited by Barbara Cohrssen. 2021 John Wiley & Sons, Inc., DOI: 10.1002/0471435139.hyg142, pp. 1-23.

Nebula Haze, “Week-by-Week Timeline of the CannabisFlowering Stage: 12/12 to Harvest (with Pictures)” May 25, 2024, pp. 1-33, Retrieved from the Internet; <URL: https://www.growweedeasy.com/cannabis-flowering-stage.

* cited by examiner

METHODS OF MATURING CANNABIS PLANTS

BACKGROUND OF THE INVENTION

The *cannabis* plant belongs to the genus *Cannabis*. There are varieties of different *cannabis* plant strains, which are suitable for the production of *cannabis* for medicinal applications. *Cannabis* material for medical use may be produced from dried *cannabis* flowers or from extracts of *cannabis* flowers. A *cannabis* flower can comprise several hundred different active ingredients, among them plenty of different terpenes and cannabinoids. One of the most active cannabinoids is tetrahydrocannabinol (THC). Other cannabinoids are for example cannabidiol (CBD), cannabinol (CBN), cannabicyclol (CBL), cannabichromene (CBC), cannabigerol (CBG) and delta-8-tetrahydrocannabinol. Terpenes produced by the *cannabis* plant can influence the physiological effect of cannabinoids. (EP3771330).

The *Cannabis* plant produces numerous secondary metabolites including cannabinoids and terpenes, which are known for their therapeutic effect. Many of these metabolites are produced in a special structure, termed glandular trichome, developed mostly on leaves called bract that encapsulates the female's reproductive parts in the female flower. The cola, which is a cluster of flower buds (inflorescences) that grow tightly together, develops upon induction of flowering on every growing tip, emerging from leaf nodes along the stem. As the flower develops the trichrome go through ripening process having three visible stages: translucent, opaque, and amber, simultaneously with a change in the content of the secondary metabolites.

*Cannabis* is in high demand for its "feel good" and dopamine inducing effects Increasingly, there is also increased demand for its use in medical applications. *Cannabis* material for example is useful in the treatment of several diseases such as multiple sclerosis. *Cannabis* material may also have beneficial effects in patients who suffer from chronic pain, muscle spasms, insomnia, posttraumatic stress disorder, dizziness during chemotherapy and low appetite. (see EP3771330)

It is very difficult to link chemical profile to disease alleviation due to the inconsistency in *Cannabis* plant extracts. In addition, when it comes to the commercial sale of *Cannabis* products, only two numbers seem to matter; the list price and its THC content. So-called super potent *cannabis* flower, with THC of greater than 25%, will dominate dispensary shelves and justify charging $75 or more.

However, at least one study found that THC content is a poor indicator of potency. High-THC weed does not necessarily equate to the potency of a *Cannabis* plant in terms of its euphoric effects. The article discloses that there many more factors at play than THC. There are a host of cannabinoids, including CBD as well as more than 100 others, most of which are not even tested for. There are also aromatic compounds called terpenes that dictate how *cannabis* affects the mind and body. All of these work in concert, a phenomenon known as the "the entourage effect". This is why synthetic THC simply never had the same medical effects as smoking "weed". ("Science Reveals the *Cannabis* industry's greatest lie: you're buying weed wrong (and so is everyone else), Chris Roberts, Jun. 23, 2022))

So while THC which is attributed as the main active cannabinoids that triggers the body to produce dopamine and the "feel-good" chemicals of currently grown *cannabis* plants, there is an increasing awareness that such products are actually not potent.

In addition to lacking in potency, commercially available products can also have undesirable side-effects. Some of the most common adverse side effects include paranoia, panic attacks, depression & anxiety. Accordingly, administration of commercially available *cannabis* products to obtain its "feel-good" effects or for medical purposes can result in not only the equivalent of a placebo with little beneficial effects, but a placebo with adverse effects.

Certain articles disclose techniques for reducing these adverse symptoms resulting from the use of these products. (see "Marijuana Induced Panic Attacks: A Recovery Guide", https://www.youtube.com/watch?v=_KbrehmP7aw; "Marijuana-Induced Panic Attacks: THE TRUTH" https://www.youtube.com/watch?v=xuUWDZjfLEQ). In other words, these articles accept the side effects and disclose methods to alleviate the side effects, rather than focusing on the product itself.

There is a need for *Cannabis* plant products which are not only potent in terms of their beneficial effects (e.g., increased dopamine "feel-good" effects and medical uses) but which also do not lead to negative side effects.

SUMMARY OF THE INVENTION

The present invention pertains to methods of growing *cannabis* plants for improved effectiveness or potency for recreational and medicinal uses, as well as to compositions containing extracts from said improved *Cannabis* plants. In one aspect, the invention pertains to methods of maturing *cannabis* plants before flowering. *Cannabis* obtained from the matured plants produced according to methods of the invention are highly potent in that it induces psychoactive experience in users, with also minimal if any side effects.

In one embodiment, the present invention is directed to methods of growing or maturing a *Cannabis* plant which includes the step of maturing the plant during a growth or vegetative stage accordingly to a light schedule for a duration of time until the plant has reached a particular height prior to switching to a different light schedule to induce a flowering stage.

In one embodiment, the duration of the growth or vegetative stage occurs until the *cannabis* plant reaches a height of 6-10 feet prior to inducing the plant to flower such as by switching the *cannabis* plant to a different light schedule. For example, the duration of the growth/vegetative stage before flowering the plant can occur until the plant reaches a height of 6 or 7 or 8 or 9 or 10 feet. In one preferred embodiment, the duration of the growth or vegetative stage and light schedule occurs until *cannabis* plant reaches a height of from 8-10 feet prior to inducing the flowering stage. Inducing the plant to a flowering stage can be done by switching the *cannabis* plant to a different/second light schedule.

In one embodiment, the duration of time during the vegetative stage is 12-16 weeks prior to switching to the flowering state. For example, the length of veg stage the plant is kept in prior to flowering can be 12 or 13 or 14 or 15 or 16 weeks. In another embodiment, the duration of time for the growth or vegetative phase is 12-14 weeks.

In a separate embodiment, the *cannabis* plant is matured during a growth or vegetative stage which includes stressing the plant when the plant has reached a height of 3-4 feet. For example, the height of the plant where stressing techniques as described herein are used can be 3 or 4 feet prior to flowering the plant.

In a separate embodiment, the inducement to the flowering stage includes starving the plant of water. Starving the plant is a technique where the water intake of the plant is reduced.

In one embodiment, the growth/vegetative light schedule is provided according to a first light schedule of 16-24 hours or more of light during the growth or vegetative stage, and the light schedule during the flowering stage is provided according to a second light schedule of 10 hours or less. In another embodiment, the growth/vegetative light schedule is provided according to a light schedule of 24 hours (i.e., “constant light”) during the growth or vegetative stage. In another embodiment, the growth/vegetative light schedule is provided according to a light schedule of 16-17 hours (i.e., 8-9 of darkness or a 16-17/8-9 light schedule).

In a preferred embodiment, seedlings and clones are kept under 24 of hours light for the initial 1-2 weeks of growth, but the light illumination given is lower (light intensity can be lowered by using an adjustable ballast or lower wattage bulbs).

In another embodiment, a source of light is a lamp or bulb. In a preferred embodiment, the lamp or bulb is a metal halide (MH) lamp or bulb for the light schedule during the growth or vegetative stage, and a source of light is a high-pressure sodium (HPS) light or bulb for the light schedule during the flowering stage.

In separate embodiments, the metal halide (MH) lamp is a 1000 w (MH) lamp or bulb. For optimal growth one 1000 w bulb is recommended per 2 plants. 1000 w (HPS) bulbs are preferred during the flowering stage.

In a separate embodiment, the light intensity of the lamp or bulb is reduced when the plants are young and the light intensity is increased as the plant grows. Adjustment of light intensity can be performed for example by using an adjustable ballast. For example, light intensity may be reduced to 500 w when the plants are young and as the plant grows, the light intensity may be increased up to 1000 w.

In separate embodiments, light intensity is increased using reflective films. In certain embodiments, one bulb or lamp is used for 8-10 plants.

In a preferred embodiment, the *Cannabis* plant is grown in a 25 gallon pot during the growth or vegetable stage. In a separate embodiment, the *cannabis* plant is started in a 3 gallon container but switched to a 25 gallon container during the growth stage. In yet another embodiment, the *cannabis* plant is started in a 3 gallon container, switched to a 10 gallon container and then switched to a 25 gallon container during the growth/vegetative stage.

In a separate embodiment, the source of the *cannabis* plant is an in vitro propagated *cannabis* plant which is propagated during a propagation phase prior to the vegetative or growth phase.

In a separate embodiment, the source of the *cannabis* plant for propagation is from a mother plant which has itself been developed and grown according to the methods of the invention during the growth or vegetative stage prior. Accordingly, and according to the methods described herein, the mother plant will never be flowered prior to using the mother plant for propagation.

In a separate embodiment, the source of the *cannabis* plant is a seed. In a preferred embodiment, the seed is a non-genetically modified seed [non-GMO].

The source of the *cannabis* plant for the methods of the invention can advantageously be any strain as long as the method of cultivation herein described are followed, and the starter plants used are developed and cloned properly from a mother plant which was not flowered and grown using non-GMO seeds. If the *cannabis* plants are cultivated according to the method described herein using starter plants grown from non-GMO seeds or cloned from mother plants that are kept without flowering which are also grown from a non-GMO seed, the *cannabis* from the plant will definitely be potent to induce psychoactive cerebral high and euphoria in users, no matter which strain the *cannabis* plant belongs to.

In some embodiments, the strain is *Cannabis sativa* L. In a separate embodiment, the strain is a *cannabis* Indica.

In another embodiment, *cannabis* plants grown according to the methods of the present invention are harvested after the flowering stage. The harvested *cannabis* from the plant will have actual psychoactive potency to induce psychoactive cerebral/brain high and euphoria for recreational purposes and will have enough strength/potency to alleviate or give relief for medicinal users compared to the *cannabis* products that are currently available in the market which are not potent to induce psychoactive cerebral high and euphoria but has unwanted counterproductive side effects.

In a separate embodiment, the *cannabis* plants are harvested as soon as the trichomes starts to change color from white to a darker color.

In separate embodiments, compositions containing the harvested *cannabis* plants according to the above methods are included. In some embodiments, the compositions are pharmaceutical compositions.

DETAILED DESCRIPTION OF THE INVENTION

Definitions

Figure 1:
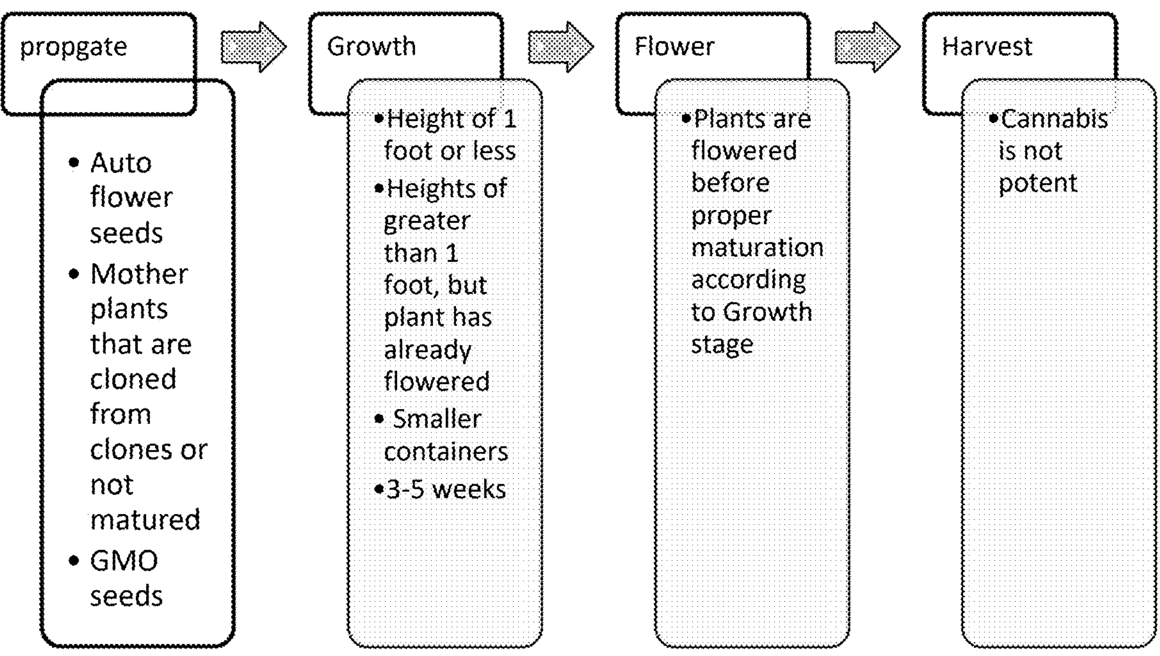
FIG. 1 depicts a flow chart summary of commercial techniques widely used to grow *cannabis* plants during the propagation, vegetative and harvesting stages.

“Auto flower” refers to *cannabis* to *cannabis* strains. This is different from “photoperiod strains” which flower independently of night lengths. While photoperiod strains rely on changing light conditions, auto flowering varieties transition into flowering around 3 to 5 weeks after seed germination, regardless of light cycles. Unlike photoperiod strains that initiate flowering in response to an increase in nighttime hours, auto flowers remain unfazed by light variations. This can be highly advantageous to growers for many reasons including faster turnaround time, no need to alter the light cycle artificially through light deprivation to induce flowering. While auto flowers demand essential elements such as light, water, warmth, and nutrients for optimal growth, their flowering schedule is not contingent on dark hours like their photoperiod counterparts. We have surprising discovered that *cannabis* starter plants grown from autoflowed seeds that are used for cultivation is not going to result in producing potent *cannabis* that will have psychoactive effects and euphoria when harvested.

“*Cannabis*” refers to a genus of flowering plants that includes at least three species, *Cannabis sativa, Cannabis indica*, and *Cannabis ruderalis*, as determined by plant phenotypes and secondary metabolite profiles (chemotype). Both marijuana and hemp plants are in this genus and produce a unique family of terpeno-phenolic compounds called cannabinoids. The cannabinoids typically produced in greatest abundance are cannabidiol (CBD) and Δ.sup.9-tetrahydrocannabinol (THC). CBD and potent THC have been shown to have different physiological effects when ingested. *Cannabis* is used to produce hemp fiber and hemp oil, for medicinal purposes, and as a recreational drug. Hemp cultivars of *Cannabis* are bred to produce minimal levels of THC, while commercial *cannabis* cultivars are bred to produce higher levels of THC that is not potent to induce a psychoactive experience of cerebral high in users. CBD has been shown to have a number of medically useful effects such as anti-inflammatory, anti-convulsant, antioxidant, antiemetic, anxiolytic and antipsychotic effects.

"*Cannabis* plant" means a plant of the family Cannabaceae. The *cannabis* plant can be for example genetically modified plants or genetically unmodified plants. In this application "*cannabis* plant" may refer to the cultivated plant at any stage of cultivation from an optional propagation phase until harvesting. The *cannabis* plant may be chosen from *Cannabis sativa, Cannabis indica, Cannabis ruderalis* and/or hybrids thereof.

"*Cannabis* plant source material" means a material capable of growing into a *cannabis* clone. The *cannabis* plant source is further capable of growing into a grown *cannabis* plant. The *cannabis* plant source is for example a *cannabis* plant embryo, *cannabis* meristem or *cannabis* meristematic cells, *cannabis* callus or *cannabis* callus cells, a *cannabis* seedling or a *cannabis* cutting. Preferably, the *cannabis* plant source is a *cannabis* seedling and/or a *cannabis* cutting.

"*Cannabis* clone" refers to a young *cannabis* plant developed out of the *cannabis* plant source. A *cannabis* clone for example has developed small roots, shoots and leaves. Typically, *cannabis* clones reach a height of not more than 15 cm. The *cannabis* clone can for example be the *cannabis* plant after an optional propagation phase and before the growth phase. "Propagation phase" means the time period, wherein the *cannabis* plant source is grown into a *cannabis* clone.

"*Cannabis* plant" refers to a plant of the genus *cannabis* of the family of Cannabaceae. Cannabaceae is a small family of flowering plants. The family may include about 170 species grouped in about 11 genera, including *Cannabis* (hemp, marijuana), *Humulus* (hops) and *Celtis* (hackberries). *Cannabis* is a genus of flowering plants in the family Cannabaceae. Three species may be recognized: *Cannabis sativa, Cannabis indica*, and *Cannabis ruderalis*. However, *C. ruderalis*, and even *Cannabis* indica, may be included within *C. sativa*. All three may be treated as subspecies of the single species *C. sativa*. Hence, the term "*Cannabis*" may herein refer to e.g. *Cannabis sativa Cannabis* indica, or *Cannabis ruderalis.*

"*Cannabis sativa* L." (marijuana) contains cannabinoids, a unique class of terpenophenolic compounds which accumulates mainly in glandular trichomes of the plant. Over 100 cannabinoids have been isolated from marijuana, the major biologically active compound being A9-tetrahydrocannabinol, commonly referred as THC.

"Mature *cannabis* plant" refers to the *cannabis* plant after the growth phase and before entering the flowering phase. A mature *cannabis* plant as described herein is a *cannabis* plant which has reached a desirable height. For example, in one preferred embodiment described herein, the *cannabis* plant has reached a height of at least eight feet before entering the flowering stage.

"GMO (or genetically modified organism)" refers "GMO" stands for Genetically Modified Organism. GMO seeds are created in labs for desirable traits by injecting seeds with genes from another plant. Some of these traits could be withstanding drier weather conditions or harmful insects. Unlike hybrid seeds that are products of cross-pollination, GMO seeds are generated in labs via gene modification.

"Growth phase" means the time period, wherein the *cannabis* clone grows into the grown *cannabis* plant.

"Flowering *cannabis* plant" refers to the *cannabis* plant when the *cannabis* plant is for example growing buds or is blooming (e.g. at the end of the growth phase). The term can refer to any developmental stage shortly before growing buds until harvesting of the flowers. "Flowering phase" means the time period subsequent to the growth phase until harvesting of the flowers. During the flowering phase, the *cannabis* plant can further grow and increase its size. The time point when the *cannabis* plant starts to flower buds can vary and can fall within the growth phase and/or flowering phase. Preferably, the time point when the *cannabis* plant starts to grow flower buds falls within the flowering phase.

"Harvested *cannabis* material" refers to the *cannabis* material that was harvested from the flowering *cannabis* plant for further processing and can refer to any part of the *cannabis* plant after cutting off. The harvested *cannabis* material may refer to the *cannabis* plant after cutting the main stem at its lower part. The harvested *cannabis* material can also refer to the flowers after cutting off the flowers from the stems. The harvested *cannabis* material can also refer to the flowers after trimming. "Trimming" means cutting off residual leaves and other plant material other than flowers from the harvested *cannabis* flowers to substantially separate the flowers from other parts of the plant.

"In vitro" or "vitro" propagated plants are plants that are grown in a laboratory under sterile conditions using a process called in vitro propagation. This process involves taking cuttings, or explants, from plants grown in a greenhouse or field, disinfecting them, and planting them on an artificial growth medium. The explants are then exposed to a controlled set of growth conditions, which can lead to the regeneration of disease-free plants.

"Dried *cannabis* material" refers to *cannabis* material after drying the harvested *cannabis* material. During drying, a substantial part of the moisture of the harvested *cannabis* material is removed. The dried *cannabis* material may refer to cut and dried *cannabis* flowers.

"Hemp" refers to *cannabis* that consists of less than 0.3% THC. While hemp still contains a low percentage of this cannabinoid, it is most often seen as the "non-psychoactive" form of *cannabis*. Hemp, also known as industrial hemp, is a type of *cannabis* plant grown specifically for the industrial uses of its derived products. In the United States, *Cannabis* is classified as hemp if it accumulates no more than three-tenths of one percent (i.e., 0.3%) concentration of tetrahydrocannabinol (THC) at harvest maturity. Hemp plants can also accumulate high levels of cannabidiol (CBD), which is used in a variety of consumer goods, including food, drinks, dietary supplements and cosmetics. Hemp is used for its fiber in a wide variety of products, including food, rope, clothing, bioplastics, and more.

"Light schedule" refers to the numbers of hours of light provided based on a 24 hour day. For example, a second light stage during a flowering stage of 12/12 refers to 12 hours of light and 12 hours of darkness. A first light schedule during a growth or vegetative might include a light schedule of 16 hours of light which would accordingly mean that the schedule includes 8 hours of darkness during the 24 hours. Different light schedules are provided during the growth or vegetative stage and the flowering stage according to the methods of the current invention.

"Sterilized *cannabis* material" refers to the *cannabis* material after sterilizing and can for example be dried and sterilized *cannabis* material, such as dried and sterilized *cannabis* flowers.

"*Cannabis* extract" refers to *cannabis* material after the optional extraction. The *cannabis* extract can for example be a *cannabis* resin or a *cannabis* oil.

"Indoor" means an enclosed space having at least four walls and a ceiling wherein the temperature, the light, the humidity and/or the gas mixture can be controlled. "Indoor" can for example be inside a house, a greenhouse, a room, a hall, a chamber or an incubator. In preferred embodiments, the indoor space is large enough to allow for cultivating at least 1,000 *cannabis* plants, preferably at least 10,000 or at least 50,000 *cannabis* plants.

"Plant propagation" refers is the process of growing new plants from various sources, such as seeds, cuttings, and other plant parts. It is the process of increasing the number of plants or a particular species or cultivar. It can be a natural or man-made dispersal of seeds, and is usually part of the plant's growth cycle. There are two primary forms of plant propagation: sexual and asexual.

"Sexual propagation" involves the floral parts of a plant, such as the union of pollen and egg, to create a new plant with genes from two parents. In nature, this usually involves the production of seeds that germinate and grow into new plants when given the right conditions.

"Asexual propagation" involves taking a part of a single parent plant, such as a stem, root, or leaf, and causing it to regenerate into a new plant. This new plant is genetically identical to its parent. Asexual propagation techniques, such as cutting, budding, and grafting, can help create semi-mature plants faster than waiting for seeds to sprout. Cutting is a popular method because it is less risky for the parent plant.

"Potency" or "potent" refers to the ability of the *Cannabis* from the plant produced according to the methods described herein to alleviate, improve or treat a wide range of symptoms, including pain, inflammation, nausea, depression, anxiety, paranoia, panic attacks, mood swings, sleeplessness, muscle spasms, stress and more. In some embodiments, "potency" also refers to the ability of the *Cannabis* from the plant grown according to the methods described herein to increase the dopamine "feel-good" effects often sought be recreational users of *cannabis* (Euphoria & psychoactive cerebral/brain high). Accordingly, *cannabis* from the plant that can induce psychoactive experience and euphoria would be considered "potent". Potency can be measured based on the strength of the psychoactive experience & euphoria users get and the duration it can last. Potency of the *cannabis* from the plants grown according to methods herein described can be assessed by comparing the ability of the *cannabis* from the harvested plants to induce a brain high and euphoria along with the duration it can last for recreational purposes and actual results/relief for medicinal purposes compared to the *cannabis* from the plants which are not developed and matured before flowering according to the methods of the invention.

"Counterproductive or negative side effects" refers to those side effects which are undesirable from the perspective of a user of a products derived from a *cannabis* plant. As described herein, the *cannabis* plants that are developed and matured according to methods before flowering disclosed herein exhibits no counterproductive side effects other than the addiction to the potent *cannabis* along with the possible negative side effects smoking can cause on health of the users. Increased food appetite, cotton mouth [dry mouth] and short-term memory loss are common whether the *cannabis* is potent or not. Users of the *cannabis* that is available in the market can mistakenly confuse cotton mouth, increased food appetite and the short-term memory loss along with the other counterproductive side effects as 'HIGH'; This is because such users never had a chance to smoke the potent *cannabis* that is psychoactive because it is not available in the market. The plants grown according to the methods described herein eliminates all the counterproductive side effects of the *cannabis* that is currently available in the markets and provides psychoactive cerebral high and euphoria to the users.

The term "cerebral high" from *cannabis* refers to a type of intoxication characterized by an uplifted mood, increased mental stimulation, enhanced creativity, and heightened sensory perception. Users often report feeling more focused or mentally engaged, and they may experience a sense of euphoria or laughter. A cerebral high is a clear-headed, highly functioning creative high. This is normally (but not exclusively) brought about by smoking any potent *cannabis* strains. Many different neurotransmitters are known to be involved with the production of feelings of euphoria, including dopamine, serotonin, oxytocin, most of the endorphins, and probably all of the seven known endogenous cannabinoids that are produced in the brain. Similarly, many different brain regions are involved in the production of the subjective feelings of euphoria, including the medial prefrontal cortex, anterior cingulate gyrus, nucleus accumbens (NAcc), and insular cortex.

The term "euphoria" from *cannabis* refers a heightened state of happiness and well-being that users often experience after consuming *cannabis*. It can manifest as intense feelings of joy, relaxation, and contentment. This effect is said to be primarily linked to THC, the psychoactive compound in *cannabis*, which interacts with the brain's endocannabinoid system, influencing mood and emotion. The intensity and duration of euphoria can vary based on the potency/strength of the *cannabis* to induce psychoactive effects. More peaceful, relaxed, or calming, euphoric highs are characterized by blissful feelings that are typically high-energy. One of the best ways to determine euphoric high is to look at the color of the eyes. A subject's eyes will turn blood red in color when smoking potent *cannabis* (users can get rid of it using eye drop products like Visine and clear eyes). The stronger the cerebral high is the darker or reddish the users eyes will get. *Cannabis* currently available in the market does not do this, or turn the eyes slightly red (very light faded tint, that is hard to notice) if excessively consumed (abused).

"Hydroponics" refers to a setup where *cannabis* plants are grown in buckets or carts filled with an inert growing medium, and are suspended over a tank full of water. The water is filled with all of the nutrients plants need to survive and thrive, and air stones are used to aerate the tank. Spray systems and pumping systems are also available.

The term "plant batches" refers to a mechanism to record the cultivation processes of CRBs for the track-and-trace system and are required by law in most jurisdictions. A plant batch is a group of *cannabis* plants started simultaneously, often legally required to be of the same strain.

The term "starter plant", also known as a seedling, transplant, or start, is a plant that is ready to be planted and is usually a few weeks old. They are grown by professional growers in greenhouses, where they receive ideal conditions for temperature, moisture, and nutrients.

"THC (TETRAHYDROCANNABINOL)": refers to the main active cannabinoids that triggers the body to produce dopamine, the "feel-good" chemical, and is thus known for its mind-altering effects. As has been discussed, however, current commercial *cannabis* products with high THC content, actually does not lead to potent *cannabis* products that can induce a psychoactive cerebral high and euphoria in users. These products also often have undesirable side-effects such as induction of paranoia.

"Wet Trimming" refers to removing *cannabis* leaves immediately after cutting down the plant during the harvesting stage.

"Dry trimming" refers to removing the leaves after the plant has been hung to dry for a few days during the harvesting stage.

The present invention is directed to methods for producing *cannabis* material suitable for medical or recreational use comprising at least a growth phase, a flowering phase, and harvesting of *cannabis* material. The method may further comprise a propagation phase before the growth phase. The method may further comprise drying harvested *cannabis* material, sterilization of dried *cannabis* material and optionally extraction from the dried *cannabis* material. It should be understood that the singular articles "a", "an" and "the" do not necessarily mean that the singular is intended. Instead, singular articles should be construed as meaning "at least one".

Plants of the family Cannabaceae possess commercial value and have many uses and applications which arise from the natural products that are extracted from their flowers. For instance, hops are extracted from the flowers of *humulus* plants in this family. Hemp has multiple uses, including food and as a fiber for making clothing, rope, etc. *Cannabis* plants have long been considered to have medicinal properties. Cannabinoids, which are compounds derived from *cannabis*, are a group of chemicals from *Cannabis sativa* or *Cannabis* indica plants that may especially activate cannabinoid receptors (i.e., CB1 and CB2) in cells. (US 2016/0184237)

There may be at least 85 different cannabinoids that can be isolated from *cannabis*. These chemicals are also produced endogenously in humans and other animals and are termed endocannabinoids. Synthetic cannabinoids are man-made chemicals with the same structure as plant cannabinoids or endocannabinoids. Cannabinoids are cyclic molecules exhibiting particular properties such as the ability to easily cross the blood-brain barrier, weak toxicity, and few side-effects. The most notable cannabinoids are Δ9-Tetrahydrocannabinol (i.e., THC) and cannabidiol (i.e., CBD). Medical benefits attributable to one or more of the cannabinoids isolated from *cannabis* have been described (see US2016/0184237).

*Cannabis* Growing Process:

A. Propagation Stage:

Plant propagation is the process of creating new plants from existing ones. It can be used for many purposes, such as home gardening, cloning plants, or creating hybrids. There are two main types of plant propagation: sexual and asexual.

Asexual propagation involves taking a part of one parent plant, such as a stem, root or leaf, and causing it to regenerate into a new plant. The new plant will be genetically identical to its parent.

Asexual propagation techniques, such as cutting, budding, and grafting, can help create semi-mature plants faster than waiting for seeds to sprout. Cutting is a popular method because it is less risky for the parent plant.

Sexual propagation involves the union of pollen from a male plant with an egg from a female plant, using the genes of both parents to create a new plant. This type of propagation uses the floral parts of the plant. In nature, sexual reproduction, or the production of seeds, is the most common form of plant propagation.

Cross breading techniques can be used to create varieties of different potent *cannabis* strains that has the psychoactive properties to induce a cerebral high and euphoria. Cross-breeding is the process of combining genetics from two or more parent plants into a single new plant. And it's not a process unique to *cannabis*.

Crossbreeding *cannabis* plants, also known as hybridization, involves selectively breeding different strains to create new varieties with desired traits. The process involves taking a male plant from one strain and a female plant from another strain and allowing the male plant to fertilize the female. There are two types of crossbreeding: inbreeding (crossing females and males of the same strain) and outbreeding (crossing male and female plants of different strains). To crossbreed, take mature pollen from the male and place it on the mature female flowers. (see "The Best New *Cannabis* Crossbreeds" updated on the web May 14, 2024, at https://wayofleaf.com/staff-picks/new-marijuana-strains-cross-breeding-growing-and-more/)

*Cannabis* is a dioecious plant, meaning the sexes are represented separately in male or female plants, and, generally speaking, both sexes are required to produce a fertilized seed (as opposed to monoecious plants like tomato vines, which can reproduce with themselves). Male plants produce pollen which fertilizes the female pistils, which in turn produces seeds. In the wild, this process usually consists of a male plant "dropping" its pollen, which is then carried on the breeze to surrounding plants. *Cannabis* pollen can remain viable on the wind for up to ten miles before its efficacy is significantly diminished. Female plants grow dozens of flowers each reaching out with pistils looking for this pollen, and once the female plant has been fertilized, much of its energy is diverted from growing flowers to growing seeds. This is why we grow feminized plants for marijuana flower, and why male plants in the grow room pose such a threat. Unless, of course, you want to breed some *cannabis*. Pollinating a grow room can be as easy as shaking a male plant in the middle of the room, but most growers are more meticulous, especially when crossing new strains. In these cases, pollen is harvested from male plants and collected. This pollen is then brushed directly onto female pistils. One will know the plant has been successfully fertilized when the bracts at the base of the stems begin to swell, or the tips of the pistils turn amber while the rest of them remain white.

By using the Cross breading & Pollinating techniques, new equally potent strains that are psychoactive can be developed from the existing *cannabis* plant strains which was grown according to the methods described herein. And the *cannabis* obtained will have the capacity to induce psychoactive cerebral high and euphoria in the users.

In one embodiment, *Cannabis* plants are propagated from a mother plant which is not flowered and grown according to methods described herein from a non-GMO seed or a starter plant which was cloned properly according to the method described herein, by cutting the plant from long, healthy stems below a bur or node where a leaf attaches to the stem using a sharp, clean shears or scissors. The cutting must contain at least one node. The grower dips the exposed end of the cutting into a rooting hormone mixture and carefully positions it within a rooting medium in clear rooting trays. Clear rooting trays are used to see the root growth development. When transplanting from a rooting tray to a larger pot, ensure the presence of robust and healthy roots. Consider adding a bit of Mykos (mycorrhizal fungi) during transplant to enhance root development and foster a vigorous root system.

Commercial growers typically buy starter plants which are less than a foot in height, which could start flowering by the third week of cultivation. Similarly, they use Auto flower seeds to grow starter plants, which will flower no matter what the light cycle is. This way commercial growers do not have to deal with the cloning phase.

The commercial growers that are producing their own clones usually make them from younger mother plants that are not matured or cloned properly according to the method described herein. The growers do not have much of an option to check if non-GMO seeds were used to develop the starter plants. And there is no option to find out if the clones used to develop the starter plants to grow the mother plants from were cloned properly according to the methods described herein on how to clone the starter plants. Commercial growers prefer younger mother plants. The reasons behind this include the belief that as *cannabis* plants age, they become more susceptible to different diseases than when they were younger.

There are a few disadvantages using the method described herein compared to the methods used currently by commercial growers when it comes to profits. Firstly, there is the significant additional cost for extra resources and the additional time required to complete the growth cycle (batch). The extra yield from the bigger plants will somewhat compensate for the extra recourse put in. Moreover, the *cannabis* obtained from the bigger plants will be potent to induce psychoactive cerebral high and euphoria.

Secondly, the process itself can be intricate; for instance, when using non-GMO seeds, male plants inevitably grow alongside females. There is no way to separate the male from female when they are seeds. These males can be identified by tiny egg-shaped pollen sacs that appear weeks after switching the light cycle to flowering. Expertise is required for a master grower to effectively remove these males from the batch to prevent unintended pollination, otherwise the female plants in that batch will also have seeds in its flowers. This task is particularly challenging in facilities where thousands of plants are cultivated in close proximity to maximize space. This is one of the reasons we prefer tissue culture methods to develop Identically cloned starter plants (tissue cultured baby starter plants) for commercial cultivation. We suggest using Identically cloned *cannabis* starter plants that are created using tissue culture methods to be used to maintain the consistency among the *cannabis* plants for the entire batch, so that the *cannabis* flowers obtained from the same batch will all have equal (consistency) potency/strength to induce a psychoactive cerebral high and euphoria in users.

The reason we insist on using non-GMO seeds is for the outcome to be on point. We cannot take chances when cultivating thousands of plants. Using our methods with GMO seeds are a hit or miss depending on how the seeds were modified or what kind of modification had been done to the seeds. When using certain GMO seeds, our methods might work accordingly but the duration the strength of psychoactive high and euphoria could last only be for 1 hr or less in most cases. There is no way to tell when using starter plants grown from GMO seeds for cultivation according to our methods described herein will have the ability to put out *cannabis* that is psychoactive and euphoric or the time duration the experience can last, until it is harvested. But by using a starter plant which is grown from a non-GMO seed or from a cloned starter plant developed according to the methods described herein by following the described methods here for cultivation, the plants will definitely have the ability to put out potent *cannabis* that is euphoric and psychoactive when harvested.

Having said this, we have also found that *cannabis* from the plants that are grown with GMO seeds like certain feminized seeds or similar will have the same potency to induce psychoactive cerebral high and euphoria when grown according to the methods of cultivation described herein. Starter plants developed using GMO seeds like auto flower seeds, however, will not be able to produce potent psychoactive *cannabis* even if the plants are cultivated according to the methods described herein. It will be very hard to differentiate or tell that, the starter plants developed from which type of Genetically modified seeds (GMO) will be able to put out potent *cannabis* that has the strength/potency to induce psychoactive cerebral high and euphoria in users when grown according to the methods described here. Using a non-GMO seed or a properly developed clone starter plant (according to the methods described herein) to grow the *cannabis* plant according to the methods described herein will be the best way to ensure or guarantee that the *cannabis* from the plant will definitely have the psychoactive potency or strength to induce cerebral high and euphoria.

An issue with seeds lies in their difficult removal from sticky *cannabis* flowers before smoking it. When the seed gets burned during smoking, they impart a harsh taste and a strange burning odor that detracts from the premium aroma associated with high-quality potent *cannabis*. Articles suggest that seeded *cannabis* may have lower potency compared to seedless varieties. The *cannabis* from plants that are not grown according to the methods described here might never be potent enough to cause a psychoactive Cerebral High and euphoria. However, when *cannabis* plants are developed and grown using the methods outlined here, there should be no difference in potency between seeded and seedless *cannabis* flowers in terms of inducing a psychoactive cerebral high and euphoria in users, aside from the unpleasant taste and smell caused by burning the seeds while smoking. Without being bound by any theory, we believe the reason for this is because the plant is very strong and big in size before flowering compared to the little plants that were already flowered while they were too small. Strong plants have a lot of extra energy they can put to use for different purposes, like overall growth, larger leaves, seeds, larger potent *cannabis* flowers that are psychoactive, etc.)

The main drawback associated with the current cultivation practices is that the little plants are not at all strong enough to put out *cannabis* flowers that are psychoactive. Furthermore, the younger starter plants are flowered, and the *cannabis* flower grows big with the plants. An advantage is that following this method is very cost effective for cultivation, but a disaster for the users (counterproductive side effects and not getting the relief users are supposed to get). With the methods described herein, the plants are not flowered until the plants reach maturity which will take a certain duration of time (e.g., about 12 to 16 weeks) and then the flowering time for another duration of time (e.g., 4 to 8 weeks) and harvested afterwards. This duration of time does depend on the plant strain and growing conditions.

For the users that are smoking and using different *cannabis* products that are currently available in the market, the intoxication or the 'High' feeling that they experience is the strength of the *cannabis* to produce counterproductive side effects like elevated paranoia, anxiety, stress and panic attacks along with depression, etc. Abuse of certain *cannabis* edibles like CBN gummies that are grown according to the current methods shows little bodily tiredness sometimes in the users. Users of such commercial products are confusingly thinking that the counterproductive side effects are the high feelings one should get from using *cannabis* since it feels intoxicating and destructive. These are only the experiences the users are currently having when smoking or consuming such commercially available *cannabis* products, so the users are not the ones to blame. The users currently do not have the opportunity to smoke *cannabis* that are grown according to the methods describe herein to tell the difference from what is available in the market for them to purchase. Lastly, there is currently little/no competition in the market for potent *cannabis* that consistently delivers a psychoactive cerebral high and euphoria.

According to standard commercial practices, younger *cannabis* plants are considered to be in better health than older ones. We have surprisingly discovered that this type of mother plants is not the best type of mother plants for cloning to create starter plants that are able to produce *cannabis* that has the potency/strength to induce psychoactive cerebral high and euphoria. Instead, we prefer older matured 8-10 feet tall mother plants that are not flowered which are also grown from starter plants using non-GMO seeds or clones developed according to the methods described herein for our cloning process to create starter plants.

Contrary to current commercial practice and in preferred embodiments herein, the mother plant is a plant which has been matured according to the methods described herein for growing a *Cannabis* plant that can produce potent *cannabis* which can induce psychoactive cerebral high and euphoria. For example, the mother plant should be at a desired height (e.g., 8-10 feet) without flowering.

In separate preferred embodiments, the plants should also be grown from seed up using a non-genetically modified seed [non-GMO].

Accordingly, in one preferred embodiment a mother plant that has matured without flowering is used for propagation. For example, if one desires to grow 1000 starter plants of any particular strain, one will start with 25 to 30 mother plants of the strain which are not flowered and grown from seed up using non-GMO seeds and cut 25 to 30 healthy proper sized trims that has at least one node are cut and transferred later into a rooting tray from each mother plant to get enough trims for 1000 starter plants. The first 1000 starting plants are referred to as the "first batch". To create a second batch of plants, one would go back to the same mother plants after a certain length of time [e.g., after harvesting the 1st batch] such as 3 to 4 months and take another 100 clippings and repeat the procedure.

A problem with this procedure is that each subsequent batch will be less potent to induce psychoactive cerebral high than the prior batch. Since the mother plants are very strong and big when the trims are taken from them, there would not be much noticeable difference in the psychoactive potency with the first 5 batches. But after about 5 batches, the psychoactive potency and the time duration the experience can last will start to decrease noticeably to a level that the mother plant will need to be replaced. This can be done by replacing mother plant(s) with new mother plants grown from non-GMO seeds to the correct maturity level without flowering as described herein and start the new batch procedure with this new mother plants.

Accordingly, in a preferred method, starter plants are cloned from the mother plants using the trims from a healthy 8-10-foot-tall mother plant which is grown using a non-GMO seed that is kept unflowered. The same mother plants could be used for about 5 batches or so to obtain trims. We recommend this method of developing starter plants because, this is the only way to make sure that the *cannabis* obtained is psychoactive and euphoric for sure every time, when harvested. Even if the method of cultivation described herein is followed for the starter plants that are cloned using GMO seeds or when the clones are developed from mother plants that are grown from clones or when the trims for clones are obtained from a younger mother plant to create starter plants, the *cannabis* obtained cannot be guaranteed to have psychoactive potency and euphoria (might work sometimes in some cases, chances are very minimum). Following the methods of cultivation described herein along with the methods of developing the starter plants is the only way to guarantee for sure that the *cannabis* obtained will be psychoactive and euphoric.

In a preferred embodiment, the source of the *cannabis* plants for the methods described herein is in-vitro ("vitro") propagated *cannabis* plant. Vitro propagation techniques offer efficient multiplication yields of disease-free *C. sativa* L. plants and Indica strain plants at a commercial scale. Generally, such techniques eliminate space needed to keep all the mother plants and reduce production costs and the turnaround time to finish out the batch. The products of these processes display genetic and phenotypic uniformity [i.e., identical twins]. In terms of their morphological trails, which include some of the major commercially important trails. Moreover, the method has tremendous potential for genetic transformation by modifying both the genetic information and the regulation of those gene responsible for the production of valuable biological active substances. (Mitsis, "An Alternative in vitro Propagation Protocol of *Cannabis sativa* L. (Cannabaceae) presenting efficient rooting, for commercial production" Plants, 2022, 11 (10): 1333).

Commercial growers will typically buy starter plants. The cloning facility clones off this starter plants. A major disadvantage with this method is that the growers do not know where the starter plants come from or how they were cloned or developed. Vitro propagation using a known mother plant that is not flowered which was developed or cloned according to the methods described here is advantageous to maintain the consistency in potency with the *cannabis* obtained to induce psychoactive experience and euphoria. Accordingly, a preferred source for the propagation stage in certain embodiments of the current invention is a known mother plant that is not flowered and grown to maturity according to the methods herein described.

In a particularly preferred embodiment, the source of the *cannabis* plant for in-vitro propagation is a mother *cannabis* plant which itself has been developed and grown during a growth or vegetative stage according to the methods described herein. We have surprisingly discovered that using mother plants as the source for the rooting's to develop starter plants or clones that are grown according to the methods of the present invention results in real potent *cannabis* that can induce proper psychoactive experience and euphoria when harvested.

In preferred embodiments, the methods of the current invention include a propagation phase wherein a *cannabis* plant clone is obtained from the *cannabis* plant source. A propagation phase may take place before the growth phase.

"Propagation" means the process of growing a new plant clone from a plant source material.

In some embodiments, the *cannabis* plant source is a *cannabis* seedling and/or a *cannabis* cutting taken from a mother plant which is developed and grown according to the methods described herein. In these embodiments the sources are non-genetically modified seeds.

For cultivation, it can take from about 5 to 6 months to grow a *cannabis* plant from seed to the time of harvesting. One way to accelerate the cycle is by starting with a clone. The plant from which it was taken is called a mother plant. The use of clones avoids the seed germination phase. Once the clone has developed roots it can be planted as a seedling.

From the grown *cannabis* plant, *cannabis* cuttings can be obtained by cutting suitable parts of the grown plant, for example lateral shoots, main shoots or parts thereof. A grown *cannabis* plant can for example provide more than 20 cuttings. A grown *cannabis* plant that provides *cannabis* cuttings is referred to as described above "mother plant".

One method of cloning is to keep Mother plant in a different room under light constantly without flowering. Clones are then obtained off the mother plant for each batch. In particular, the cultivator takes the trim, dips it in the rooting gel (rooting hormone) and put it in a tray for root growth in rooting medium to create starter plants.

A disadvantage with using a Mother plant for trims that are grown according to the methods described herein for too many batches is that the method reduces potency of the *cannabis* plant with each batch cultivated. While this cloning procedure can be effective for about 5 batches, the potency of the plant will typically decrease after 5 batches. After this time, one will need new mother plants from seed up for the next round of 5 batches or so, in order to maintain the same potency with the *cannabis* obtained from the plants to induce psychoactive cerebral high and euphoria.

Another disadvantage of cloning from the Mother plants is that the facility will be needing to maintain enough mother plants for every strain they will be cultivating, which is extensive and troublesome because of the extra efforts, space and resources involved.

In some embodiments, the tissue cultured *Cannabis* plantlet is genetically modified. In some embodiments, the tissue cultured *Cannabis* plantlet is a genetically or genomically modified. In some embodiments, the tissue cultured *Cannabis* plantlet comprises a transgene. In some embodiments, the tissue cultured *Cannabis* plantlet is a transgenic plantlet. In some embodiments, the tissue cultured *Cannabis* plantlet is genetically edited.

In some embodiments the duration of the propagation phase is at least 2 days, at least 3 days, at least 4 days, at least 5 days, or at least 6 days. A longer propagation phase allows for the formation of more, longer and larger roots and provides for a healthier *cannabis* clone. Thereby the *cannabis* plant may absorb more nutrients for example during the growth phase and during the flowering phase. As a result, the *cannabis* plant will grow faster during the growth phase, grow more and larger flowers during the flowering phase and synthesize a larger amount of active ingredients. In embodiments, the propagation phase does not exceed a duration of 28 days, 21 days, or 14 days. It turned out that extending the propagation phase beyond that time would not significantly improve the yield of harvested and/or dried *cannabis* material. In a preferred embodiment, the duration of the propagation phase is from 2 to 28 days, or from 4 to 14 days.

The longer the *cannabis* mother plant which is developed and grown according to the methods described herein stays in the vegetative stage (see below) before flowering that is in a larger pot (25-gallon or bigger), the more potency the *cannabis* obtained from the plant will have to induce a psychoactive cerebral high and euphoria.

We prefer to use tissue culture methods to grow baby starter plants that are identical twins to maintain the consistency in the potency/strength to induce cerebral high and euphoria for the entire batch of plants during cultivation. It will be a very hard task to gather enough supply of the necessary same strain seeds for the entire cultivation. Accordingly, tissue culture is the best option to create starter plants that are identical twins to maintain the consistency in potency of the obtained *cannabis* to induce psychoactive experiences and euphoria in users.

B. Growth/Vegetative Phase:

The plant clone obtained from the *cannabis* seedling after the propagation phase is, for example, further grown into a *cannabis* plant during the growth or vegetative phase. The vegetative stage is characterized by rapid growth, with the plant focusing on building its structure and increasing its size. During the vegetative stage, *cannabis* plants require more light and nutrients to support their growth.

When growing outdoors, the crop is seasonal and the plants start to flower with the shortening of days in autumn. Indoor growing allows for a *cannabis* plant to be induced into the flowering stage through artificial light control. The flowering may take place after several months of veg stage. The time duration of the vegetative stage will affect the psychoactive potency of the *cannabis* from the plant that is taken to flower.

1. Duration of Currently Followed Growth/Vegetative Stage:

Subsequent to the propagation phase, recreational and commercial growers alike will subject the *Cannabis* plant to a growth or vegetative phase which can last for example at least 1 day, at least 2 days, at least 3 days, at least 4 days, at least 5 days, or at least 6 days. A longer growth phase allows for the formation of more, longer and larger roots. Thereby the *cannabis* plant may absorb more nutrients from the growth medium. A longer growth phase also allows for the formation of more and larger leaves. Thereby the *cannabis* plant can reach a higher photosynthesis rate.

According to some growers, growth phase should not exceed a duration of 28 days, of 25 days, of 21 days, of 18 days, of 14 days, of 12 days, of 10 days, or of 7 days. It turned out that extending the growth phase beyond that time would not significantly improve the yield of harvested material and/or dried *cannabis* material. Without being bound by any theory, this is happening because the plants are kept in a 3- or 5-gallon pot, which does not have the extra room to support the root growth which is necessary for the plant to grow bigger in size to increase the yield. A too long growth phase has been described as leading to the formation of too many and too large leave and stems thereby decreasing the growth of flowers. Accordingly, the duration of the growth phase should typically be from 2 to 28 days, or from 4 to 14 days.

2. Duration of Followed Growth/Vegetative Stage According to Preferred Embodiments:

We have surprisingly discovered that the above growth duration for the *cannabis* plant, does not equate to a *cannabis* plant that can put out potent *cannabis* that has psychoactive properties when harvested. In contrast, the present invention includes a longer duration of the vegetative stage (e.g., 12-16 weeks) prior to switching to the flowering state. This 12-14 weeks of veg stage (i.e., duration of growth/veg stage) is measured from the starter plants to flowering stage.

Without being bound by any theory, the inventor(s) herein have discovered that when the methods or developing clones and methods of cultivation described herein are followed, longer growth/vegetative stage prior to flowering will result in actual potent *cannabis* that can get the users psychoactive cerebral/brain high and euphoria when harvested.

In certain preferred embodiments of the current invention, the duration of the vegetative state is between 12 to 14 weeks as part of a light schedule described herein prior to a flowering stage.

The more significant variability in growth cycle time for a *cannabis* plant occurs in the vegetative stage, which follows the seedling phase and occurs before flowering. When growing outdoors, the crop is seasonal and the plants start to flower with the shortening of days in autumn. Indoor growing allows for a *cannabis* plant to be induced into the flowering stage through artificial light control. This may take place after only a few weeks or after several weeks. The time duration of the vegetative stage that the plant is kept in, will determine the psychoactive strength/potency of the *cannabis* obtained when grown according to the method described herein and the size of the pot that the plant is in will affect the height and size of the plant that is taken to flowering stage.

In some embodiments, the degree of potency depends upon the duration of the growth phase of the *cannabis* plant prior to inducing flowering. For example, using a duration of 8 weeks instead of the 12 to 16 weeks in the growth/veg stage, the *cannabis* obtained will be less potent than from the *cannabis* from the plant that stayed in growth/veg state for 12 or 16 weeks. The extended time duration of veg stage is recommended to get the plant to 8-10 ft height before flowering. The extended daily lighting schedule, intensified light output and an accelerated feeding schedule (booster feed) can all supplement to cut short the time need for to get the plant to reach 8-10 ft in height quicker.

As will be explained below, this length of duration is intertwined with plant height (e.g., a plant that reaches 8-10 feet in height prior to induction of flowering during the growth/vegetative stage will be more potent than a 6-foot plant). This variation in duration of the veg stage and plant height can be used in production of *cannabis* with varying potency when developed and grown according to the methods described herein.

Accordingly, and as will also be explained in the next section, when developed and grown according to the methods described herein, the *cannabis* obtained from plant which reaches about 2-feet in height and up without flowering will have some potency to induce psychoactive cerebral high and euphoria. It will be about the 4th week when the plant reaches 2-feet, depending on the strain, feeding schedule and lighting. For production of *cannabis* with medium potency/strength, the duration of the growth/veg stage can be around 9 weeks prior to flowering. Likewise, to obtain *cannabis* with the much lower potency strength for users with less tolerance *cannabis* plant could be flowered by the 7th week.

As disclosed herein, a larger container such as a 25-gallon pot is required for plant to reach the 8 ft height along with the 12 to 16 weeks of veg stage. Plants that are kept in smaller pots (5-10 gallons) will never reach the 8 ft height with longer veg period because the pots are too small to provide the necessary space for root growth to support the plant to reach the height of 8 ft.

During the Vegetative stage of the plant, the objective is to be able to create a canopy that covers as much of the space as possible. This growth serves to maximize use of the light source provided by increasing the size of the plant to receive light. The faster the canopy can be created, the sooner a grower can switch the plants to the flowering stage, shortening the overall growth period. (See WO2023161915).

3. *Cannabis* Plant Height:

As noted above, light makes the *cannabis* plant grow, and darkness is a signal for the plant to flower. We have surprisingly found that there is an optimum period of time and *cannabis* plant growth height during the growth stage prior to entering the flowering stage.

Current cultivation techniques let the *cannabis* plant to flower as early as possible, so that the flower grows with the plant. However, we have surprisingly discovered that delaying the flowering stage until the *cannabis* plant has reached a particular height is the way to have psychoactive potency not only in terms of euphoric effects for recreational users but also for medical uses of *cannabis*. Some of the known medical benefits are actual relief from muscle spasms, anxiety, paranoia, depression, panic attacks, stress, sleeplessness etc. Certain strains of potent *cannabis* promote sexual appetite, endurance and sexual stamina.

The key we have found is the *cannabis* plant height prior to letting the plant enter the flowering stage such as by changing the light cycle. Even if the *cannabis* plant grows to 20 feet, current practice is to flower the plant when it is around 1 foot tall. The current technique is to let the plant grow with the flower, (plant is flowered at very early stage, and the yield increases as the plant gets bigger). The problem with this conventional practice is that the ultimately harvested *cannabis* from the plant will not be potent at all to induce a psychoactive cerebral high and euphoria as *cannabis* from the plant which has for example cloned and grown according to the described method and reached a height of 8 to 10 feet during the Vegetative or growth phase before flowering. It will be impossible to have the *cannabis* obtained from the plants that were flowered when it was a foot in height or less to have the potency or strength to induce a psychoactive cerebral high and euphoria in the users. Because the plant was prematurely flowered when the plant was too young; it was never a strong plant. An analogy might be a child in the womb. If the child is born prematurely too small, it will not matter how large the child gets after birth; it may cause complications. Similarly, we have found that if the *cannabis* plant is too small before entering the flower stage, it is too late to obtain a plant that can produce potent *cannabis* that can induce psychoactive cerebral/brain high and euphoria in the users. Because that small plant was never strong enough before flowering to produce strong/potent *cannabis* that can have the potency to get users psychoactive cerebral/brain high and euphoria.

We have also found that there are preferred heights for the plants before flowering to obtain potent *cannabis* from the plants. From about two feet and higher without flowering, the *cannabis* plant will start maturing. When developed and grown according to the methods described herein, *cannabis* obtained from the plant that was at 2 ft height when flowered will have very little potency to induce psychoactive cerebral high and euphoria and the time duration the experience will last could also be very short. As taller and hence stronger the plant gets before flowering, the greater the potency of the *cannabis* flower becomes. For example, when the plant reaches five feet tall before flowering, the *cannabis* from it will be more potent than the *cannabis* from a plant that flowered at 2-feet but less potent than the *cannabis* from a plant that flowered at six feet. The *cannabis* from a plant which reaches six feet before flowering will be more potent than the *cannabis* from a plant reaching 4 or 5 feet before flowering but will be less potent than the *cannabis* from a plant reaching 8 feet before flowering.

In some embodiments, the degree of potency depends upon the height of the *cannabis* plant prior to inducing flowering. For example, 8-10 feet can be used as a marker for plant height prior to induction of flowering during the growth/vegetative stage if the user wants strong potency, 6-feet can be a marker for medium strength and 5 feet can be a useful marker for low strength. A marker for minimum potency before flowering can be 4-feet.

Similarly, when the methods described herein are followed for development and cultivation, the *cannabis* obtained from the plant that is kept in a 3-gallon pot without flowering for 12 weeks or more will have less potency to induce a psychoactive cerebral high, and the duration the experience can last will be less as well compared to a plant that was kept in 5-gallon pot for the same amount of time without flowering. The potency level or strength of the *cannabis* from the plant to induce cerebral high and euphoria will increase as the pot size which the plant is kept in increases. Without being bound by any theory, we believe this is due to the fact that larger pots will give roots more room to grow resulting in bigger plants.

When the methods described here are followed for development and cultivation, the bigger the plant is before flowering the potent the *cannabis* from it will be to induce a cerebral high and euphoria. For example, we have found that the *cannabis* from an 8-foot plant which was kept in a 25-gallon pot which flowered after reaching that height that was cloned and gown properly according to the methods described here will have premium potency to induce psychoactive cerebral high that can last for more than half a day. The taller and bigger the *cannabis* plant is before flowering, the optimized the cerebral high and euphoria from it will be, when the *cannabis* obtained from it is smoked. The bigger *cannabis* buds from taller and bigger plants that are cloned and grown according to the method described herein can induce mind blowing psychoactive cerebral high and euphoria even if the flower is big in size.

Accordingly, in one embodiment of the current invention, the *cannabis* plant is matured until it has reached a height of between 6-8 feet without flowering. In a particularly preferred embodiment of the current invention, the *cannabis* plant is matured without flowering until it has reached a height of 8-10 feet prior to entering the flowering stage. In a separate embodiment, the plant is matured until it has reached a height of between 11-15 feet during the growth phase without flowering. In another embodiment, the *cannabis* plant is matured without flowering until it has reached a height of 6-15 feet.

While heights of greater than 15 feet are also contemplated, they are less preferred because there is a tradeoff which starts to occur as the plant start to approach such heights. An analogy might be alcohol. While the 150 proof might have much more strength to induce intoxication than 100 proof, but having such increased potency with *cannabis* will lead to fulfillment effects in the users.

In other words, the greater the potency of the *cannabis* is, to induce psychoactive cerebral high and euphoria in the users, the lesser the quantity of *cannabis* the users will need to smoke/consume to enjoy the psychoactive cerebral high and euphoria for an extend period of time. It can be compared to one person having 2 steaks to eat; after finishing the 1st one, the individual will be too full to eat the 2nd one for a while. This can occur the same way with the cerebral high and euphoria from potent *cannabis*. Once the user achieves a certain level of euphoria and psychoactive cerebral high from the potent *cannabis* grown from the plant using our methods described herein, the extra consumption will not do much more damage like it is with alcohol. Abusing alcohol can lead to being sick, throwing up etc. But in the case with potent *cannabis* grown using the method described herein the abuse will be saturated, meaning that there will not be much more of a greater cerebral/brain high experience the users can enjoy or achieve by overdoing it. And by nature of the potency of the *cannabis* grown by the methods described herein, users will not have an appetite for abuse as well on top of the psychoactive cerebral/brain high they have already reached.

Accordingly, a *cannabis* plant which is between 8-10 feet in height prior to entering the flowering stage that is grown from a non-GMO seed or cloned properly according to the method described herein is what is really preferred by the methods of cultivation described herein to produce *cannabis* flowers that are strong/potent enough to get the user: psychoactive cerebral high and euphoria for a prolonged period of time (e.g., half a day or longer when smoking a joint or less depending on the users tolerance).

4. Container/Pot Size:

For plants to approach the greater height prior to flowering according to embodiments of the present invention, plants pots which are larger than those typically used in the *cannabis* horticulture industry are used. Currently, 3-gallon pots are used during the growth and flowering stage. While using smaller pots are less costly, lesser requirements and less feeding [the smaller the pots are, the less feed it requires] but they will not support the type of growth/height required for the *cannabis* plants during the vegetative stage which are required for the current invention.

The container/pot size is related to the size of the plant. The smaller the pot size the lesser the plant height will reach, which will in turn reduce the potency when flowered. Even if we age the plant longer without flowering, the size of the plant and the root growth before flowering, is what will correlate more to its ability to produce psychoactive *cannabis*. This is the reason why for example stressing the plant as discussed herein and keeping it at a lower height (example—5 ft) will not take away much from potency if the plant is kept in a 25-gallon pot, compared to a plant that's 5 feet tall which is kept in a 3-gallon or 5-gallon pot. Our methods are based mainly on keeping the plant in veg stage longer. Keeping the plant longer in smaller pots like 3-gallon and 5-gallon will cause root bounding. The roots will hit the edge of the grow pot and will continue to wrap around. Plants will suffer from yellowing and dead leaves when this happens. The only way to fix this is to remove the plant from the pot and prune (cut off) the wrapped roots. This is not practical when growing thousands of plants.

Accordingly, in some embodiments of the present invention, a pot or container which is greater than 3 gallons is used for *cannabis* plant growth during the vegetative stage. In particular embodiments, the size of the *cannabis* plant pot is 15 or 16 or 17 or 18- or 19-gallon sized container/pot. In yet an even more preferred embodiment, the size of the pot for growing the *cannabis* plant is 20 or 21 or 23 or 24 gallons. In a most preferred embodiment, the pot is a 25-gallon pot. In yet other embodiments, the container/pot is 26 gallons or greater.

While 3-gallon pots can be used initially to grow *cannabis* plants for better root formation structure during the vegetative stage according to embodiments of the present invention, the plants will later need to be moved to larger pots with a greater capacity than 3-gallons to reach heights according to embodiments of the present invention.

Accordingly in some embodiments, starter plants are planted initially into 3-gallon pots for better root formation (better root structure), then moved into a 25-gallon pot as they grow higher. In other words, 3-gallon pots are used in the beginning of the cultivation to plant the starter plants in for better root formation and structure for further stage of growth.

In some embodiments, the starter plants can be planted right into 25-gallon pots. It is not that easy to change out pots a few times on the batch when thousands of plants are cultivated. In such cases, the starter plant can be planted straight into the 25-gallon pot, particularly when performing commercial cultivation.

Accordingly, in separate embodiments of the present invention, the *cannabis* plant is started in a 3-gallon container/pot but is then moved to a container which is greater than 3 gallons which used in embodiments of the current invention so as to support the required growth/height according to the embodiments of the current invention. In one embodiment, the plant is started in a 3-gallon pot and subsequently moved to a 25-gallon pot. In yet another embodiment, the plant is tart in a 3-gallon pot, moved to a 10-gallon pot and then subsequently moved to a 25-gallon pot to reach heights according to embodiments of the present invention.

In conclusion, in preferred embodiments, the plant needs to be matured to a height such as 8-10 feet before flowering. A 25-gallon pot is required to provide enough space for root growth for the plant to reach that height. Also, starter plants are preferably grown from a non-GMO seed or cloned according to the methods described herein to have potent *cannabis* that can induce cerebral high and euphoria in users when harvested. The vegetative state is extended (e.g., 3-4 months) without flowering. Larger pot sizes are selected to ensure the root growth for the plant to reach the optimal strength and height before flowering.

As has been previously described, when the methods of development and cultivation described here are followed, *cannabis* with varying potency can be produced depending on the length of the veg stage and height of the plant. Accordingly, a plant which is to be flowered at a shorter duration such as at the end of 7th week, will only need a 5-gallon pot. A 25-gallon pot will not make that much difference in potency in this case, because plant is being flowered early. But will yield more when it stays longer in a 25-gallon pot even after being flowered at the end of the 7th week.

Ample space for root growth is also required for *cannabis* plants to reach the required height and hence maturity prior to switching the light schedule to induce flowering of the plant. Accordingly, in one embodiment each of the pots above should contain a single *cannabis* plant.

5. Light Schedules:

Preferred embodiments of the current invention include a light schedule of at least 16 hours of light during the vegetative or growth phase in order to keep the *cannabis* plant from flowering.

Accordingly, in some embodiments, the *cannabis* plant is exposed to light during the vegetative/growth phase for at least at least 16 h per day, at least 17 h per day, at least 18 h per day, at least 19 h per day, at least 20 h per day, at least 21 h per day, at least 22 h per day, at least 13 h per day or at least 24 h per day. “Light exposure” means that the artificial light source is switched on. A longer daily light exposure will increase the growth and hence height of the plant in less time [faster growth to achieve desired heights, for example 8 feet to 10 feet] which as stated is correlated with the maturity of the plant before flowering and potency of the *cannabis* obtained from the plant to induce a cerebral high and euphoria in the users.

In preferred embodiments, the *cannabis* plant is exposed to light for at least 18 h per day (i.e., 18 hours light/6-hour dark cycle), at least 19 h per day, at least 20 hr. per day and at least 21 hours per day. In even more preferred embodiments, the plant is exposed to light for at least 22 (i.e., 22 hours light/2 hours dark cycle) or at least 23 hours per day. In some embodiments, the plant is exposed to light for 24 h per day (i.e., “constant light source” which is 24 hours light/0-hour dark cycle)) and hence is at a constant rate of time until the plant has reached a desirable height (e.g., 8-10 feet) before the light cycle is changed to induce flowering of the plant. If the plant seems to get weak because of the extended lighting period one can adjust the lighting schedule to less hours and give the plant more dark hours to rest.

In a particularly preferred embodiment, the growth/vegetative light schedule is provided according to a light schedule of 16-17 hours and thus 8-9 of darkness (i.e., a 16-17/8-9 schedule). We have found that under 16-17 hours of light and 8-9 hours of rest, the *cannabis* plant will not flower. The plant can reach an optimal height using such a schedule in the right size pot, and the plant is matured with excellent strength without flowering. Flowering can subsequently be induced by switching the light schedule to a 12/12 light schedule during the flowering stage.

In a separate embodiment, the growth/vegetative light schedule is provided by a light schedule of 24 hours of light (i.e., “constant light”). Although a constant light schedule can be used, it does risk overworking the plant. In a separate embodiment, the growth/vegetative light schedule is 24 hours (i.e., “constant light”) followed by a light schedule during the flowering stage of 12 hours or less per day.

If the plant is hesitant to flower after the vegetative stage, the plant(s) can be starved. Starving the plan involves a reduction of water intake. Accordingly, to induce a *cannabis* plant which is having difficulty to flower after the vegetative/growth stage, water intake of the plant can be reduced.

Most growers are no longer using photoperiodic plants. When photoperiod plants are used, commercial growers typically use an LED light source for around 12-18 hours. The downside of keeping the light ON for longer is the extra electricity that will be need. If the plants that are photoperiodic is still used by commercial growers or anyone else for cultivation, the current popular feeding chats from the leading feed manufactures suggest a feeding schedule only for 10 weeks (from the starter plant stage to harvest) to finish out the batch. Accordingly, even if the plants used currently are photoperiodic and the LED light schedule of 12-18 hours is followed, which will be very rare because the only reason for any of the current commercial growers or anyone else to be using a longer daily light period schedule is only to accelerate the growth of the plant; it is not to keep the plant from flowering.

As stated, most growers do not even use photoperiodic plants anymore. Commercial growers these days are mostly using the starter plants from auto flower seeds for much easier and faster cultivation cycle which will flower no matter which light schedule is followed by the grower.

Even in the case of photoperiodic plants, a major difference in the methods described herein is that even if the plants are kept under light longer per day for it to not flower, the duration of the time the plants are kept without flowering according to the current invention (e.g., 12-16 weeks without flowering) is different from the current methods of cultivation (3-5 weeks max without flowering) and the size of the pot that the plants are kept in is also different. The plants as described according to the methods herein described also reach a greater height (e.g., 8-10 feet) prior to flowering.

The difference of the described method herein is the extra weeks that is required by the method for the plant to stay in veg stage (to reach 8-10 feet in height) before being flipped to flowering, not the hours per day the plant stayed under the light unflowered. And the big pot that plant is kept in during the extended period, so that the plant can reach the desired height of 8-10 ft before flowering.

According to currently practiced methods, the plants are switched to flowering light schedule after the first 3 to 4 weeks of growth when the plant is about a foot in height or so. Furthermore, the plants are also kept in a 3-to-5-gallon pots during the cultivation until harvest to save space in the grow facility, which is not suitable for the plant to have the extra root growth to get to the desired height and size (e.g., 8 ft-10 feet tall) before flowering according to the methos described herein.

6. Light Source:

Preferably, the indoor method according to the present invention comprises an artificial light source, such as a lamp or bulb. The light source should emit high energy as well as an optimized spectrum, thereby improving the photosynthesis rate of the *cannabis* plant. One common artificial light source used in the industry includes using a plurality of LEDs. The plurality of LEDs provides for high energy emission and precise adjustment of the emitted spectrum. Preferably, the artificial light source comprises at least one reflector. For example, the reflector guides the light to the surface of the leaves of the *cannabis* plant and increases the leaf surface area exposed to the light, thereby improving the photosynthesis rate. Improving the photosynthesis rate contributes to achieving the intended high amounts of active ingredients and weight ratio of flowers and leaves relative to stems.

Preferably, the artificial light source comprises a housing and a heat sink. A housing and a heat sink allow for improved heat management. The housing preferably comprises aluminum. An aluminum housing improves cooling of the lamps and dissipation of the heat emitted by the artificial light source. The housing preferably comprises a plate for heat conduction with a thickness of at least 1 mm, at least 2 mm, at least 3 mm, or at least 3.5 mm. The thickness preferably is at most 200 mm, at most 100 mm, at most 70 mm, or at most 50 mm. The thickness improves the heat dissipation of the light source and improves the life span of the artificial light source. In a preferred embodiment, the thickness is of from 1 mm to 70 mm, or of from 2 mm to 50 mm. Preferably, the artificial light source comprises a ventilation and/or convection system.

High-pressure sodium lamps (HPS), metal halide lamps (MH), and light-emitting diode lights (LED) have all been used to provide a light environment for indoor *cannabis* cultivation.

Modern commercial growers as stated above primarily use LED lighting due to its ability to enhance yield. New generation LED lights offer a higher yield compared to traditional HPS bulbs. However, as yield increases, potency tends to decrease unless the plant is of considerable size before flowering. The downside of the described method herein while adapting it for commercial cultivation is the extra turnaround time it takes to finish the batch and the extra space bigger plants will take up along with the extra feed and the extra electricity. Commercial growers usually try to harvest around twice a month, if possible, to maximize the profits, while growing properly according to the method described here will only allow to harvest once every 3 to 4 months resulting in 3 to 5 harvests a year depending on how fast the plant growth was accelerated during each batch. The faster turnaround time to finish out each batch required by commercial growers to maximize the profits can be somewhat matched by the extra yield (extralong and big size *cannabis* flowers) big plants will put out even with the longer turned around time it requires to finish out the batch.

With respect to LED bulbs, there are LED bulbs that can put out light lumens that are somewhat close to 1000 w (MH) and 1000 w (HPS) bulbs comparatively 30% or so less light lumens. If this kind of LED light bulbs are used to grow *cannabis* plants which are grown from non-GMO seeds or cloned according to the methods described and grown according to the methods described here, then the *cannabis* from the plant will show somewhat of a lower potency to induce a psychoactive cerebral high and euphoria compared to using 1000 w (MH) and 1000 w (HPS) bulbs for cultivation (the duration or length the psychoactive cerebral high and euphoria will last will also be less when LED bulbs are used). While LED does have advantages in terms of cost and ease of use, we have actually found that it is not as effective as alternative light sources in terms of leading to more potent *cannabis* that is psychoactive from the plant after harvesting compared to the 1000 w (MH) or 1000 w (HPS) bulbs. In addition, we have found that a duration of greater than 18 hours of light is preferable in terms of faster growth for the *cannabis* plant. Light promotes faster growth.

We have discovered, however, that the size of the *cannabis* plant, potency and the yield are always proportional. Bigger plants before flowering can produce bigger *cannabis* flowers (buds) that are potent to induce psychoactive brain/cerebral high and euphoria. That way yield will be greater and the potency to get the users psychoactive cerebral high and euphoria will be still there without being compromised. But the methods of development and cultivation described herein needs to be followed.

LED lights prove advantageous as they facilitate higher yields even from smaller plants. Moreover, they eliminate the need for extensive temperature controlling in the growhouse, as they emit minimal heat. The benefits are very high for the growers, lower electric bills, bare minimum heat so there's no need for A/c, 2× more yield and promotes a shorter cultivation time as well for a faster cycle and turnaround time to finish the batch.

However, we have surprisingly discovered that LED as a light source does not result in a plant to produce potent *cannabis* flower compared to using 1000 w (MH) and 1000 w (HPS). Accordingly, while there are many advantages as stated above in using LED as a light source for the cultivation of *cannabis*, LED is not a good source of light when considered from the perspective of insuring that the *cannabis* from the plant has a high degree of potency to induce a psychoactive cerebral high and euphoria. In methods of the current invention, a more preferable light source is a 1000 w (HPS) or 1000 w metal halide (MH) bulb.

When a *cannabis* plant is grown from a non-GMO seed or a clone starter plant which is cloned according to the method described herein, in a 25-gallon pot and not flowered until it reached 8-10 ft tall but used LED bulbs instead of 1000 w (MH) bulbs or 1000 w (HPS) bulbs will have less strength or potency to induce psychoactive cerebral high and euphoria and the duration the experience can last in the users compared to using (MH) and (HPS) bulbs for cultivation.

(HPS) and (MH) bulbs generate significant heat and lower yields compared to LED lights, LED's take less energy as well and gives the light exposure without causing heat stress.

As a result, the *cannabis* industry has avoided the use of (HPS) and (MH) bulbs as a source of light for *cannabis* cultivation. However, we have surprising discovered as stated herein that *cannabis* from the plant that is cultivated under 1000 w (MH) bulb lighting during veg stage and 1000 w (HPS) bulb during the flowering stage will have much better potency induce psychoactive cerebral high and euphoria compared to LED's.

LED lights typically yield around 1-1.5 grams per watt, whereas HPS bulbs yield approximately 0.5 grams per watt. Consequently, (HPS) bulbs produce significantly lower yields compared to LED lights. The industry has accordingly avoided using HPS bulbs as source of light during the cultivation.

The current inventor has found, however, that growing the *cannabis* plant to heights according to embodiments of the present invention is not only beneficial from the view-point of the potency of the *cannabis* from the plant to induce psychoactive cerebral high and euphoria, but that it can also compensate for the lower yields obtained when using the light source such as (MH) and (HPS). Bigger *cannabis* plants put out bigger *cannabis* flowers that has the potency to induce psychoactive cerebral high and euphoria if they are grown from non-GMO seeds or cloned according to the methods defined.

During the vegetative stage, we have also found that 1000 w Metal Halide (MH) bulbs are particularly beneficial from the standpoint of their ability to promote short, bushy growth and 1000 w (HPS) bulbs are favored during flowering, encouraging early stretching of the plants.

Accordingly, in an even more preferred embodiment, the light source is a 1000 w metal halide (MH) light during the vegetative state. In a particularly preferred embodiment, metal halide (MH) lights are used during the vegetative growth stage, and 1000 w high pressure sodium (HPS) is used during the flowering stage.

For the lighting, our preferred method is to use the 1000 w bulbs. No one uses this high of a wattage because of the heat stress they will cause the plants.

Even when *cannabis* plants have been grown using HPS as the light source, it is recommended to switch to the flowering state when the plant is about 12 inches tall using a 250 W HPS, when the plant is about 17 inches tall using a 400 W HPS and switching the plant to a flowering stage when the plan is about 21 inches tall using a 600 W HPS. (see What is the Optimum Final Height for *Cannabis* Plants? by Nebula Haze, obtained from the web at https://www-.growweedeasy.com/best-height-indoor-*cannabis*-plants).

In contrast, preferred embodiments of the current invention perform switching to the flowering stage at the point when plants are much higher. Taller plants without flowering as stated herein not only serves the purpose of having actual potency for the *cannabis* from the plant to induce psychoactive high and euphoria but it can also compensate for the lower yields when a (HPS) and (MH) is the light source. Accordingly, in one preferred embodiment the *Cannabis* plants are grown to a desired height and maturity without flowering (e.g., 6 or 7 or 8 feet or even higher) which will also compensate for this loss in yield using High-pressure sodium lamps (HPS) and (MH) bulbs as the source of light. In particularly preferred embodiment of the present invention, the *cannabis* plant has reached a height of between 10-12 feet prior to switching to a flowering stage for optimal potency that can induce sustainable euphoria and psychoactive experience in the users.

In other embodiments of the invention the light source is (HPS) or metal halide and the plant is matured until it reaches a height of six feet. In another embodiment, the light source is (HPS) or metal halide, and the plant is matured to a height of seven feet. In an even more preferred embodiment, the light source is (HPS) or metal halide, and the plant is matured until it reaches a height of eight feet. In another embodiment, the light source is (HPS) or metal halide, and the *Cannabis* plant is matured until it reaches a height of nine feet. In particularly preferred embodiment, the light source is metal halide, and the *Cannabis* plant is matured until it reaches a height of 8-10 feet, prior to switching to the flowering stage. (HPS) is used during the flowering stage.

The extent of maturation & growth without flowering is controlled by keeping the *cannabis* plant under a light source, such as metal halide, such as for 18-24 hours. We mature the plant to desired heights prior to allowing it to flower. This is done by keeping the plant under light such as for 18-24 hours until it has matured to the desirable height such as 8-10 feet before switching the light cycle for the plant to flower.

In embodiments, the *cannabis* plant is exposed to HPS or metal halide light for at least 16 h per day, at least 17 h per day, at least 18 h per day, at least 19 h per day, at least 20 h per day, at least 21 h per day, at least 22 h per day, at least 23 h per day and 24 h per day. "Light exposure" means that the artificial light source is switched on. A longer light exposure will increase the growth without flowering and hence height of the plant which as stated is correlated with the maturity and potency of the *cannabis* from the plant to induce a psychoactive cerebral/brain high and euphoria. In other embodiments, the *cannabis* plant is exposed to (HPS) light or (MH) light for at least 18 h per day, at least 19 h per day, at least 20 hr. per day and at least 21 hours per day. In other embodiments, the plant is exposed to (HPS) or metal halide light for at least 22 or at least 23 hours per day or even 24 hours per day until the plant has reached a desirable height (e.g., 8-10 feet) before the light cycle is changed to induce flowering of the plant.

7. Light Intensity and Number of Bulbs:

According to certain embodiments of the invention, the light intensity can be reduced when the plants are young and the light intensity increased as the plant grows using for example an adjustable ballast. For example, light intensity may be reduced to 500 w when the plants are young and as the plant grows, the light intensity may be increased up to 1000 w.

For example, the *cannabis* plants can start off below 500 w. The light intensity schedule will depend on various factors such as on the height the light fixture is placed in the grow facility. For example, the higher the light fixture is placed, the more light watts intensity it will take. Once the plant reaches a certain size such as above 15 inches in height, the light provided can be adjusted to 1000 w.

In certain embodiments, 1000 w metal halide bulbs are used during vegetative stage after the *cannabis* plant reaches above 20 inches in height. An adjustable ballast can used to control the light output intensity. When the plants are small, they do not need a 1000 w bulb, because it will be too much light.

In separate embodiments, light intensity can be increased using reflective films. In certain embodiments, one bulb or lamp is used for 8-10 plants.

In certain embodiments, the light intensity will be reduced to 500 w using an adjustable ballast when the plants are young. As the plant grows the light intensity will be increased.

When growing for personal use, it is recommended that 1 bulb is contributed/used for every 2 plants. When growing commercially, it is recommended that 1 bulb will be contributed to 8 to 10 plants because of the space restrictions [plants will be kept much closer in a commercial grow space]. Light intensity efficiency can be increased using reflective films.

The more light a plant receives, the faster the plant will grow. Accelerating the plant growth to finish out the batch and maximize yields in shorter period. The only way to accelerate the plant growth is to give the plant more light and/or an intense feeding schedule.

In certain embodiments, the plant is given more light and/or an intense feeding schedule to accelerate plant growth. In one preferred embodiment, seedlings and clones are provided constant light in the beginning stage. For example, the seedlings and clones are kept under 24 of hours light for the initial 1-2 weeks of growth, but the light illumination given is lower (light intensity can be lowered by using an adjustable ballast or lower wattage bulbs). The reason to keep the seedlings and the clones under constant light in the beginning is that it needs initial time to develop the necessary tissues to store the extra energy it received from the daylight schedule to use for the night-time growth. Until they develop the necessary tissues for storage constant light is preferred.

Protecting the roots from destruction by not watering directly into the pot can also promotes faster growth of the *cannabis* plant. This preferred practice of the current invention is in contrast to current commercial growers who are watering the plant directly into the pot.

8. Watering and Temperature Control:

In preferred embodiments, the *Cannabis* plant is only watered at the inner rim of the pot using spray emitters, drip irrigation or micro spray irrigation to prevent the root damage. When water is poured directly into the pot the root damage is at maximum.

The emitters are pointed to the inner wall of the pot. This allows the water to roll down the inner wall of the pot which eliminates the root damage and that will contribute to faster plant growth.

Since 1000 w bulbs are used, heat output will be at the maximum. Temperature controlled grow space is necessary compared to humidified grow space with fans which current commercial growers are using. The A/C contributes to the stickiness, resin and the loud flavorful smell of the bud on top of keeping the plants healthy from the excess heat that comes from the bulbs without causing heat stress. Certain strains will be slightly sticky and have a slight aroma depending on the strain. Having proper temperature control and the plant having the maturity before flowering to put out big sized potent *cannabis* flowers will intensify the stickiness from the resin and aroma of the *cannabis*.

(HPS) and (MH) bulbs can be used in a grow house without A/C as well, if the light bulbs are placed far away from the plant to minimize the heat exposure. But the downside is that the growth acceleration from having the high light output (HPS) and (MH) bulbs will be reduced or minimized because of the lesser light intensity plants will receive as the distance between the light source and the plants increases.

Hydroponics refers to a setup where *cannabis* plants are grown in buckets or carts filled with an inert growing medium, and are suspended over a tank full of water. The water is filled with all of the nutrient's plants need to survive and thrive, and air stones are used to aerate the tank. Spray systems and pumping systems are also available. The only draw-back is the electricity outage or the backup power default when it is time to pump or spray water to the roots will damage the plants.

The advantage to using hydroponic methods or using a different growth medium like rockwool, etc. is the reduction in pests compared to using dirt/soil. That way less pesticides can be used which will contributes to less rejections from labs when tested before sending it to retailers for sale.

It is important to note, however, that if the *cannabis* plant is cultivated according to the methods described herein using starter plants developed according to the methods described herein, *cannabis* that is potent to induce psychoactive cerebral high and euphoria in users can be obtained, no matter which type of cultivation process is followed. Following the methods of cultivation and the methods of starter plant development described herein are the key regardless of the different ways or process the growers use for cultivation (like Hydroponics) to obtain *cannabis* that is psychoactive and euphoric.

9. Stressing Techniques:

In some embodiments, the *cannabis* plants can be matured at lower heights than what has been described above. These embodiments are preferable to increase the yield in a grow house space that is limited to height. In these embodiments, once the *cannabis* plant reaches above 3 feet, the top of the plant can be cut off (topping) to prevent the plant from growing straight up.

High-stress training techniques such as topping, mainlining, and super cropping are employed to stimulate the growth of additional branches from cut stems, thereby promoting increased flower production in plants by encouraging multiple bud sites. This could be done a few times during the life of the plant before the batch finishes out. Once the plant is topped at least 3 weeks should be maintained in between before stressing the plant again.

Gently bending and tying down branches with low-stress training techniques aim to create an even canopy, thereby increasing the number of bud sites and overall yield. This method allows for effective manipulation of light exposure, enhancing harvest quantity. This approach maximizes light exposure by spreading out the main stem and branches, resulting in a dense bushy growth.

The difference between stressing techniques used in current commercial methods and the methods described herein is that stressing according to the method described herein are done when the plant has reached a heigh above 3-4 feet. Stressing plants when they are too small or when they are in a smaller pot will only increase the yield by a little when flowered since the plants are small and will not have any potency at all to induce a psychoactive cerebral high and euphoria other than the counterproductive side effects as herein described. The *cannabis* that are currently available from the plants grown commercially are not potent to induce psychoactive effects to begin with, so stressing the plants that are grown using the current methods will not do anything to increase the potency except a slight yield increase. High stress training can only be done on taller plants. If the topping is done on very small plants the plant will most likely die.

Current commercially grown plants never reach above 3 ft to 4 ft tall before harvesting. So, topping cannot be done on them, they usually go under low-stress training methods. Furthermore, according to our methods the topping is only done on plants that are not flowered.

As long as the plant is in a 25 gallon pot, cloned and grown according to the methods described herein, the potency to induce psychoactive cerebral high and euphoria will never be compromised that much, because there will be more space for root growth in a big pot that contributes to a stronger plant even if the plant was topped a few times during the batch (it will be a short plant with more bud sites compared to a big plant that's 8 ft to 10 ft tall.) The way we would prefer to increase the yield without compromising the potency to induce psychoactive cerebral high and euphoria is by growing the plant as big and tall as possible without flowering according to the methods described herein. Big and strong plants before flowering that are grown according to the described methods herein will put out larger and longer *cannabis* flowers that can induce cerebral high and euphoria in the users.

Stressing can be done many times. Its goal is to create more bud sites by having more branches. The extra space for root growth is still there if a larger size pot (e.g., 25-gallon pot) is used, even if the height is cut short. Root growth is what determines the real capacity of the plant to put out potent *cannabis* even if the plant is short of recommended height after stressing.

C. Flowering Phase:

The flowering stage is when the *cannabis* plant starts to produce buds. Depending on the *cannabis* plant strain, this stage typically last between eight weeks and 7-12 weeks. During this time, *cannabis* plants require less light and may show signs of nutrient deficiencies as they focus on bud production.

In one preferred embodiment, high pressure sodium (HPS) bulbs are used during the flowering stage. For example, metal halide bulbs are used as a light source during the vegetative stage as discussed above, and then (HPS) light is used during the flowering stage.

In a particular preferred embodiment, a *cannabis* plant source material is subjected to a propagation phase with a duration of 2 to 28 days to obtain a *cannabis* clone; subsequently the *cannabis* clone is subjected to a growth phase with a duration of 2 to 28 days to obtain a grown *cannabis* starter plant; and subsequently the grown *cannabis* plant is subjected to a flowering phase with a duration of 10 to 100 days to obtain a flowering *cannabis* plant. Preferably, the *cannabis* plant source material is a *cannabis* cutting.

While the flowering hormone in most plants (including *cannabis*) is present during all phases of growth, it is inhibited by exposure to light. To induce flowering, the plant must be subject to at least 8 hours of darkness per day; this number is very strain-specific and most growers flower with 12 hours of darkness to be safe. Flowering usually lasts from 45 to 90 days indoors.

As long as the *cannabis* plant is grown according to the methods described herein, potency will not be an issue no matter what strain type of *cannabis* plant it is. Different potent strains will have their own peculiarities when it comes to the potency to induce a psychoactive brain/cerebral high and euphoria, the key is to follow the methods of growing described herein, and to follow the ways to develop the starter plants clones as described here.

1. Induction of Flowering Phage:

(i) Reduction of Light Duration: When growing *cannabis* indoors, the flowering stage begins when light duration is reduced to a 12/12 light cycle (12 hours light, 12 hours darkness each day). Getting those 12 hours of uninterrupted darkness each day gives your plant the signal that it's time to start flowering. In a way the plant "thinks" winter is coming because the days are getting short. (Nebula Haze "Week-by-Week Timeline of the *Cannabis* Flowering Stage: 12/12 to Harvest (with Pictures)", GrowWeedEasy, obtained from the internet at https://www.growweedeasy.com/*cannabis*-flowering-stage #introduction-flowering-stage-*cannabis*-week-by-week)

The timing for the veg stage and the flowering stage of the *cannabis* plant can be controlled with the lighting schedule. The lighting schedule for flowering the *cannabis* plants is similar in all cases, but the method of keeping the plant without flowering differ in several respects between the currently used method and the methods described herein. Despite extending the daily light exposure of the plant to prevent flowering, the duration of the non-flowering period (12-16 weeks) contrasts sharply with conventional cultivation methods (typically 3-5 weeks of veg stage). Additionally, there is variation in the size of the pots used to house the plants.

After the plants start flowering, they should continue to get longer dark hours (e.g., minimum 10-12 hours) until harvest to keep them from reverting back to veg stage. In other words, after the plants start budding, they should continue to get long dark nights (e.g., 10 to 12 hrs of darkness per day) until harvest, or they may revert back to the veg stage.

(ii) Starving the pant to flower: Even if the lighting schedule is switched to below 12 hours to flower the plant, the plant may not necessarily flower. Large *cannabis* plants can act differently. Starving the plant of water will trick the plant to make it think that it is about to die. This can trigger the plant to flower. Accordingly, and in some embodiments, methods of the invention include starving the plant of water to induce flowering after the plant has matured according to the methods of the invention when the *cannabis* plant hesitates to start flowering after the lighting schedule is flipped to below 12 hrs per day.

The watering ratio will be different in different situations to starve the plant. In general, the plant is given half of the water compared to what the plant was actually given regularly. And if the plant does not flower after that, the water supply can be cut into half again. Due to the heat from the high-pressure bulbs, it is not possible to put a fixed amount on the water to cut, because the amount of water to cut will depend the strength of the plant. The time to water the *cannabis* plant is usually determined by looking at the dryness of the top 1 inch soil in the pot. When the top 1 inch soil in the pot is dry, that will be the time to water the *cannabis* plant usually.

In the case when the water is cut/reduced and the heat is consistent, the plant will eventually start to faint. In such an instance, it is necessary to water the plant. Otherwise, the plant will die.

Accordingly, it is difficult to place a fixed amount of water which needs to be cut to pressure the *cannabis* plant into flowering. This is because the light intensity the plants are receiving will be depending on a range of factors such as, how high the light fixtures are placed above the plant and height of the plants. Water intake will be different in all these cases depending on the heat stress caused. The best way to determine when the plants need to be watered correctly is by looking at the dryness of the top 1-inch layer of the soil in the pot. When the top 1-inch layer of the soil in the pot is dry that will be the most appropriate time to water the *cannabis* plant.

A plant that is close to the light fixture placed above will need more water to survive and to avoid heat stress than a plant which is not as close. Also, for different size plants that are in different size pots will have different water requirements.

D. Harvesting:

1. Optimal Time to Harvest *Cannabis* Plants:

Harvesting *cannabis* at the right time is important to obtain the best quality and potency. If one harvests plants too early, the buds may lack potency and the taste can be unpleasant. On the other hand, if one harvests too late, one risks losing some of the plant's essential oils and cannabinoids, resulting in a less potent product.

Various factors can affect the optimal time to harvest *cannabis*, including the strain, the growing environment and conditions, and the desired effects. For example, some strains mature faster than others, and environmental factors like temperature, humidity, and light exposure can affect the growth rate of most *cannabis* plants.

Several important factors to help one to decide when to harvest *cannabis* plants include (1) trichome development, (2) pistil coloration and (3) leaf degradation.

Trichomes are the tiny, crystal-like structures that cover the buds, containing cannabinoids like THC and CBD. Trichomes have been described as the "glitter" on the buds. Trichomes are also the mushroom-looking growths on *cannabis*. The harvester is interested in trichomes that have a little ball on the top. As the plant matures, trichomes will change from clear to cloudy to amber. The best time to harvest may be when most of the plant's trichomes are cloudy, with some transparent trichomes turning amber. Looking at the color of the trichomes tends to be more precise than looking at the pistils of the *cannabis* plant.

Pistils are the hair-like structures on the buds that change color as the plant matures. They start as white and green color, then darken to brown, red, or orange. When around 70-70% of the pistils have changed color, it is generally another good indication of a good time to harvest the *cannabis* plants.

The fan leaves will turn yellow and fall off as the plant matures. This is a natural process, as the plant redirects nutrients to the buds. When many of the leaves are yellow, this may be another indicator of an optimal time to harvest the plants.

If a *cannabis* user prefers a more energetic and cerebral high, harvesting of the *cannabis* plants can occur slightly earlier when most of the trichomes are still clear but not yet turning cloudy. THC levels are at their peak before degrading into other cannabinoids like CBN. As buds mature, trichome heads turn milky white, which resembles plastic. These milky white trichome heads indicate the highest level of THC and CBD.

As described herein, however, the current inventor has discovered that the potency to induce psychoactive cerebral high and the euphoria along with all the other medical benefits of the *cannabis* depends on the method of growing the *cannabis* plants and the way the plant is cloned or the seed the starter plant is grown from, as described herein.

*Cannabis* from the *cannabis* plant grown according to the methods described herein have the actual strength/potency to induce cerebral psychoactive high and euphoria compared to the *cannabis* that is available in the market with a higher THC percentage concentration. In fact, we have found that this effect to induce cerebral psychoactive high and euphoria is optimal when cloned and grown according to the method described here. In other words, we have surprisingly found that potency does not depend upon increased THC % concentration as it is currently believed (unless the THC is from the *cannabis* of the plant that is cloned and grown according to the methods described herein), but rather depends upon method of growing the plants as described herein.

THC percentage concentration in the *cannabis* is not a proper way to measure its potency. Instead, potency should be based on the strength of the *cannabis* to induce psychoactive cerebral high and euphoria. *Cannabis* from the plant cloned and grown according to the method described herein will be a very strong potent psychoactive narcotic product.

For a balanced high with optimal potency, the user may want to have *cannabis* plants when about 60-70% of trichomes are cloudy and some turn amber. This window provides a good balance of THC and other cannabinoids. As long as the *cannabis* plant is cloned and grown according to the methods described herein, however, potency will not really be an issue no matter how the trichomes are. It is simply an indicator of the time to harvest.

If a user prefers a more relaxing and sedative effect, harvesting of *cannabis* plants can be done when most of the trichomes have turned amber/golden (for most strains). At this stage, THC has degraded into other cannabinoids like CBN, known for its sedative properties. However, and as stated, potency to induce psychoactive cerebral high and euphoria is not affected as long as the methods described herein are followed.

Use of a magnifying tool can make glittery, resin-filed trichomes on the *cannabis* buds easier to see. Most cameras can also take clear pictures of trichomes which can then be used for better viewing. A digital USB microscope is probably the best tool to see trichomes and determine an optimal harvest time.

In some embodiments, the *cannabis* plants are fed with plain water and nutrient feeding is stopped 1-2 weeks before harvest. This process is sometimes called "flushing *cannabis* plants" and can help remove excess salts and nutrients from the *cannabis* plant, resulting in a smoother smoke, better taste, peak potency and reduced harshness.

We have surprisingly found that harvesting the *cannabis* plant as soon as the trichomes change from white to a darker color led to better potency. Accordingly in some preferred embodiments, the plants are harvested as soon as the tricones change color.

In one preferred embodiment, the plants are harvested when the flowers are one inch in diameter or less. The reason for this is that we have found that plants which reach heights such as 8-10 feet during the vegetative stage are even more potent if the flowers have not grown beyond 1 inch in diameter. As the *cannabis* flower gets bigger the potency to induce cerebral high decreases unless the plant has been grown to a certain height (e.g., 8 ft to 10 ft tall) before flowering. The size of the plant, the potency or the strength of the *cannabis* to induce a psychoactive cerebral high and the size of the *cannabis* flower (the yield) works proportionally.

2. Harvesting Techniques:

Harvesting of plants is often done by cultivators and involves the use of hand pruners to remove large outer stems and then continually pruning inwards toward the trunk of the plant. On average, the plants are about eight feet tall and six feet wide. The stems with a cluster of buds cut from the plant, termed cola, are cut in a way to form a natural hook at the end that can be used to hang the stem with foliage on a line. The colas are typically 12-18 inches in length, but can range up to 42 inches long. The "hook line" colas are hung and kept within the harvest location or nearby. Once suspended, the outer leaves, which contain very low amounts of THC, are removed from the colas by hand or using hand pruners. This process is called "big leafing" and requires two hands, one to hold the cola and the other to remove leaves. The trimmed colas are then transported to a drying area, equipped with dehumidifiers and fans to speed the drying process. The next step after this is destemming to remove the flower from the cola. (*Cannabis* Part VIII. Specialty Areas Robert N. Phalen Ph.D., CIH First published: 24 Dec. 2020 https://doi.org/10.1002/0471435139.hyg142)

Two harvesting techniques are 1) wet trimming and 2) dry trimming.

Wet rimming involves removing the fan leaves and trimming the sugar leaves while the plant is fresh immediately after cutting it down. This method is faster and makes it easier to remove the leaves, as they are still turgid. However, it can lead to quicker drying affecting the buds' overall taste and quality.

Dry trimming removes the leaves after the plant has been hung to dry for a few days. This method can result in a slower drying process, which may improve the taste and aroma of the final product.

Hand trimming refers to the manual technique of carefully removing leaves and shaping the buds with the help of scissors or shears. Small-scale growers and enthusiasts commonly favor this approach, as it provides greater precision and gentle handling of the buds. By hand trimming, the delicate trichomes are preserved, leading to a very good product in terms of quality. However, hand trimming can be labor-intensive and time-consuming, particularly for larger harvests of indoor plants. As a result, many growers are using machine trimming, to balance efficiency and quality. Machine trimming techniques have improved.

E. Processing and Administration:

Processing *cannabis* varies with the nature of the product, which can be the dried flowers for smoking, extracts for various uses, and infusions with oils and food. (*Cannabis* Part VIII. Specialty Areas Robert N. Phalen Ph.D., CIH First published: 24 Dec. 2020 https://doi.org/10.1002/0471435139.hyg142)

The harvested plants which are matured according to the methods of the invention can be incorporated into compositions, including pharmaceutical compositions.

The best option for administration of the matured plants produced according to the invention is to smoke it. This allows all of the compounds of the plant to go straight to the brain.

Vapes, pills, wax, dabs, tinctures, edibles, and patches can also be used for administration of the *cannabis* plants.

Dried Plant: After the harvesting process is complete, the trimmed colas are taken to be dried, destemmed, and hand trimmed to produce a dried flower or bud. The drying process is typically performed in large rooms with fans and dehumidifiers to speed up the drying process. Following drying, destemming is performed using either small scissors or with use of a piece of thin metal with a hole that removes flowers when the cola stem is fed and pulled through it. Hand trimming of unwanted plant material, which is designed to make the product more presentable for sale and use, is the final step in the process. Typically, specialized Trim Station™ devices are used on the lap to hold tools/supplies and separate trimmings from the flowers. The work can also be done on a table-top. The preferred scissors are small bonsai tree pruners with the spring removed, but other types of small scissors and pruners are also used. Automated equipment is available for large-scale destemming and trimming operations, which reduces the ergonomic issues with repetitive pinch-grip actions associated with use of small scissors. (*Cannabis* Part VIII. Specialty Areas Robert N. Phalen Ph.D., CIH First published: 24 Dec. 2020 https://doi.org/10.1002/0471435139.hyg142)

Extractions: Extracting *cannabis* from the flowers and related plant parts containing the resinous trichomes produces a concentrated extract that can be used for a variety of purposes and products. Extractions can be performed with or without the aid of a solvent. Non-solvent extractions may use a dry-sieve to separate out the small resin-rich trichomes, whereas water extractions make use of the non-polar properties of the resin. Solvent extractions can involve use of several different solvents.

Non-Solvent Extractions: Dry-sieving has traditionally been performed by thrashing and pressing the plant parts against a screened surface (e.g. silkscreen) to separate the trichomes, which are then pressed into slabs to make hash. Machinery can be used to speed up this process. Grinders and fine mesh sieves can also be used to separate out the trichomes making what is called kief. Ice water or dry ice and small sieves can also be used to make stalks brittle and facilitate separation of trichomes from the plant (23, 24). Lastly, use of pressure and heat, sometimes call rosin technology or rosin tech, can be used to expel the resin from the trichome glands.

Solvent Extractions: Solvent extractions are an efficient means of extraction for THC, CBD, and other cannabinoids and it most often involves use of a solvent under varying temperature and pressure. Volatile solvents or liquefied gases are commonly used, because they can be evaporated or released from the final product more efficiently. The following solvents have been used for extractions: n-butane, carbon dioxide, ethanol, heptane, hexane, isopropanol (isopropyl alcohol), and pentane. Acetone has also been reported as an extraction solvent (24). Low boiling point hydrocarbons, such as butane and propane, are often pressurized or cooled to make them liquid during the initial extraction phase, but these solvents are illegal in some states and legal in others if used only in a closed-loop configuration. Carbon dioxide is often compressed as a subcritical or supercritical fluid, which has the advantage of allowing extractors to avoid use of toxic or flammable solvents.

The extracts are often referred to as "extraction oils," such as CO2 oil, butane honey oil, and isopropyl oil. Adequate drying of the product and use of nonpolar solvents are often preferred in the industry, due to the retention of wanted terpenes, reduction of chlorophyll extraction, and improved overall quality of the final product.

During the extraction process, a solvent is passed through the dried product to extract the oily resin and then the solvent is evaporated away to leave a concentrated extract. Vacuum ovens or similar uses of temperature and pressure are used to remove the solvent from the extract. The temperatures typically range from 27 to 82° C. (*Cannabis* Part VIII. Specialty Areas Robert N. Phalen Ph.D., CIH First published: 24 Dec. 2020 https://doi.org/10.1002/0471435139.hyg142)

F. Methods of Using *Cannabis* Plants:

*Cannabis* plants contain cannabinoids, such as tetrahydrocannabinol (THC) and cannabidiol (CBD), which can be eaten, inhaled, or otherwise absorbed into a person's body for medical, spiritual, or recreational purposes. At maturity, a female *cannabis* plant will include infructescence's (also referred to as buds) that can have up to ten times higher levels of cannabinoids than its leaves and up to one hundred times higher level of cannabinoids that its stalks.

Tetrahydrocannabinol (THC) from the *cannabis* flower of a plant that is grown according to the methods described herein and Cannabidiol (CBD) are two of the most common compounds found in *cannabis* used to treat a wide range of conditions and symptoms.

There has been considerable interest in the use of medical marijuana for the treatment of a number of conditions, including glaucoma, AIDS wasting, neuropathic pain, treatment of spasticity associated with multiple sclerosis, and chemotherapy-induced nausea.

In a collection of writings on medical marijuana by 45 researchers, a literature review on the medicinal uses of *Cannabis* and cannabinoids concluded that established uses include easing of nausea and vomiting, anorexia, and weight loss; "well-confirmed effect" was found in the treatment of spasticity, painful conditions (i.e. neurogenic pain), movement disorders, asthma, and glaucoma.

While the above benefits of medical marijuana are well documented, current *cannabis* products on the markets often do not match up to the potency promised. Such commercially available products can also have undesirable side-effects such as paranoia, panic attacks, depression & anxiety are some of the most common ones. (see "Marijuana Induced Panic Attacks: A Recovery Guide", https://www.youtube.com/watch?v=_KbrehmP7aw; "Marijuana-Induced Panic Attacks: THE TRUTH" https://www.youtube.com/watch?v=xuUWDZjfLEQ)

As noted throughout, the *cannabis* plant needs to be matured before flowering to obtain potent *cannabis* flowers that will work properly and give the users the desired relief. Otherwise, they are all just placebos which also lead to counterproductive side effects. When *cannabis* starter plants are cloned and grown according to the methods of the current invention, the *cannabis* flower obtained will exhibit actual potency to induce cerebral high and euphoria, but also no unwanted counterproductive side-effects associated with current commercial products except the common food craving (munchies), short term memory loss and cotton mouth (dry mouth).

In general, the maximum THC content of hemp is 0.3% and any *cannabis* with a THC content of greater than 0.3% is considered to be marijuana. Current commercial products, which are touted with their high levels of THC, shows no potency in terms of their ability to induce a psychoactive cerebral high and euphoric effects, but has unwanted counterproductive side-effects. We have discovered that the THC from the *cannabis* flower of a strong plant which is flowered after reaching a minimal height (e.g., 8 feet) is very psychoactive. To the contrary, THC from the *cannabis* flower of a plant that was flowered before maturing or from a plant that was cloned wrong will never be strong enough to provide a psychoactive cerebral/brain high or euphoria to the users.

Current *cannabis* products advertise their high THC concentrations to produce a so-called high. As stated, however, these products are actually not potent. In fact, they lead to many counterproductive side-effects.

TABLE 1

| Current commercial growing methods |
| --- |
| Propagation |
| Source material is cut from the mother plant that are young (for cloning) or using auto flower seeds to grow the starter plants |
| Genetically modified seeds |
| Clone from mother plants that are already clones |
| Growth/Vegetative Stage |
| Flowering starts from around the 3rd to 5th week when the plant is about a foot high or less and follows a 10-week feeding schedule from starter plant to harvest in most cases which is recommended by the popular feed manufacturers. |
| Light source is typically LED. |
| The starter plants are mostly grown from auto flower seeds. The auto-flower seeds will transition into flowering around 3 to 5 weeks after seed germination, regardless of light cycle. |
| Grown to the maximum height of 12-21 inches (i.e. 1-2 feet) in most cases using 3-to-5-gallon pots (the extra yield is minimized even with extra daily lighting schedule for accelerated plant growth or with a longer flowering period to get the cannabis flowers big. Because without the extra room for root growth the plants are not going to grow bigger to increase the yield.) |
| Flowering Phase |
| Plants are flowered very young before maturing and getting strong |
| Plants are flowered when it is about a foot high or less |
| Flowering finishes when the plant is close to 2 ft to 3 ft at the max |
| The plant grows with the flower |
| Uses auto flower seeds, which flowers no matter which light cycle is used. |
| Harvesting Stage |
| Plants harvested some-times include high concentration of THC, but no potency at all to induce a psychoactive cerebral high and euphoria. |
| Plants harvested have counterproductive side-effects inducing paranoia, depression, anxiety and panic attacks. |

Table 1 depicts commercial techniques widely used to grow *cannabis* plants during the propagation, vegetative and harvesting stages.

TABLE 2

| Our Preferred Growing Methods |
| --- |
| Propagation |
| Source material can be cannabis tissue culture cells from a matured mother plant that has not flowered. (which has grown to baby starter plants that are identical twins). |
| Starter plants are grown from seed up using non-GMO seeds. |
| The mother plants are to never be flowered or cloned from other clones. |
| Starter plants are cloned from a mother plant which is grown from seed up using a non-GMO seed and matured to a height of 8 ft to 10 ft without flowering. |
| Clones are taken from the same mother plant that has not flowered for about 5 cultivation batches. |
| Growth/Vegetative Stage |
| 12 to 16 weeks of maturing the plant without flowering. |
| Matured to the height of minimum 8-10 feet without flowering |
| Shorter heights (e.g., 3-4 feet) can be used if the plants are stressed and grown in larger pots (e.g., 25-gallon pots) to support strong root growth prior to flowering the plant. |
| Light source provided by 1000 w metal halide bulb. |
| Extra space is given for root growth of the plant using larger pot such as a 25-gallon pot so that the plant will get big and tall prior to flowering |
| Flowering Phase |
| Change light source to 1000 w (HPS) bulb |
| Changing light cycle to less than constant light or in difficult cases starving the plant to induce flowering. |
| Plant is matured by growing to minimum of 8-10 feet before flowering |
| Harvesting Stage |
| Will have potent cannabis that can induce a psychoactive brain/cerebral high and euphoria, relaxed sedative state, often associated with the stereotypical "stoner" persona-but also has the ability to alleviate anxiety, depression, pain, panic attacks, stress, spasms etc. and acts as a good & strong sleep aid, while eliciting a dreamy state and more, (i.e., Psychoactive & Euphoric) |

Table 2 depicts techniques used to grow *cannabis* plants during the propagation, vegetative and harvesting stages according to embodiments of the current invention.

Figure 2:
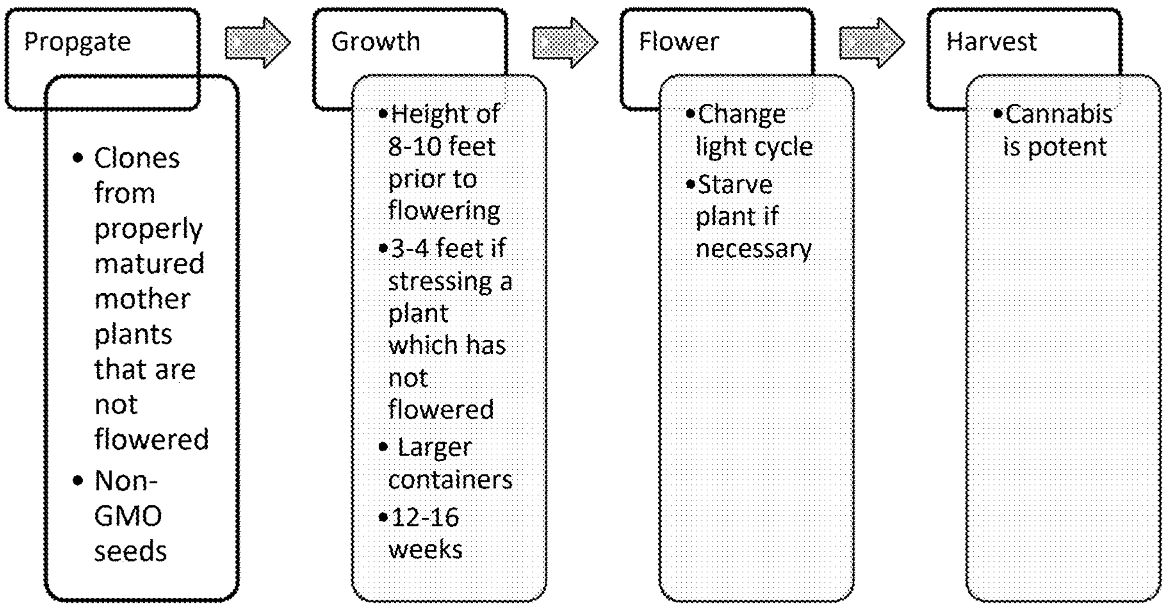
FIG. 2 depicts a flow chart summary of techniques used to grow *cannabis* plants during the propagation, vegetative and harvesting stages according to preferred embodiments of the current invention.

Some of the key features of commercial techniques widely used to grow *cannabis* plants are also depicted in FIG. 1 whereas FIG. 2 depicts a flow diagram of techniques used according to preferred embodiments of the current invention.

The THC associated with the *cannabis* from the plant that is cloned and grown according to the methods described herein will be potent to induce a psychoactive cerebral high and euphoria in the users. The *cannabis* obtained from the properly cultivated strong *cannabis* plants which are cloned and grown according to the present invention offers a multitude of benefits in terms of actual natural pain relief than promises, unparalleled euphoria, elevating mood unlike any other drugs on the market. Unlike hallucinogens, the *cannabis* plants induce euphoria without causing hallucinations. Sexual appetite and endurance are associated with certain strains of *cannabis*, relieves muscle spasms especially from MS, works as a very strong natural sleep aid, acts as an herbal stress relief, alleviates anxiety & depression while eliciting a calm & content dreamy state, builds confidence and gives a 2 dimensional view to the user.

Reported but "less-confirmed" effects included treatment of allergies, inflammation, infection, epilepsy, depression, bipolar disorders, anxiety disorder, dependency and withdrawal. Basic level research has been carried out on autoimmune disease, cancer, neuroprotection, fever, disorders of blood pressure.

Clinical trials conducted by the American Marijuana Policy Project, have shown the efficacy of *cannabis* as a treatment for cancer and AIDS patients, who often suffer from clinical depression, and from nausea and resulting weight loss due to chemotherapy and other aggressive treatments.

Glaucoma, a condition of increased pressure within the eyeball causing gradual loss of sight, can be treated with medical marijuana to decrease this intraocular pressure. Marijuana lowers IOP by acting on a cannabinoid receptor on the ciliary body called the CB receptor. A promising study shows that agents targeted to ocular CB receptors can reduce IOP in glaucoma patients who have failed other therapies.

Medical *cannabis* is also used for analgesia, or pain relief. It is also reported to be beneficial for treating certain neurological illnesses such as epilepsy, and bipolar disorder. Case reports have found that *Cannabis* can relieve tics in people with obsessive compulsive disorder and Tourette syndrome. Patients treated with *Cannabis*, reported a significant decrease in both motor and vocal tics, some of 50% or more.

Some decrease in obsessive-compulsive behavior was also found. A recent study has also concluded that cannabinoids found in *Cannabis* might have the ability to prevent Alzheimer's disease. THC has been shown to reduce arterial blockages.

Another potential use for medical *cannabis* is movement disorders. *Cannabis* is frequently reported to reduce the muscle spasms associated with multiple sclerosis. Evidence from animal studies suggests that there is a possible role for cannabinoids in the treatment of certain types of epileptic seizures. (see US20120311744)

Cannabinoid receptors and endocannabinoids are present in pain circuits from the peripheral sensory nerve endings up to the brain. Cannabinoid receptor agonists modulate nociceptive thresholds by regulating neuronal activity, but they also relieve pain by acting on non-nervous tissues.

CBI receptor is involved in the attenuation of synaptic transmission, and a proportion of the peripheral analgesic effect of endocannabinoids can be attributed to a neuronal mechanism acting through CBI receptors expressed by primary afferent neurons. Although CB2 receptors have been related traditionally to the peripheral effects of cannabinoids (mainly modulation of the immunologic responses), they also contribute to antinociception by inhibiting the release of proinflammatory factors by non-neuronal cells located near nociceptive neuron terminals. CB2 receptors are expressed in several types of inflammatory cells and immunocompetent cells. For that reason, activation of peripheral CB2 receptors generates an antinociceptive response in situations of inflammatory hyperalgesia and neuropathic pain. (CA3140916A1).

The present invention provides methods of using the *Cannabis* plants or any parts, any compositions, or any chemicals derived from said plants of the present invention. The plants produced by this invention can be used in the manufacture of a pharmaceutical composition or for a medicament for treating a number of conditions. The plants can also be used for non-medical purposes. In some embodiments the specialty *Cannabis* plants of the present invention can be used for recreational purposes. In some embodiments, the specialty *Cannabis* plants of the present invention can be used for industrial purposes. In some embodiments, the plants are used for producing food, oil, wax, resin, rope, cloth, pulp, fiber, feed for livestock, construction material, plastic and composite materials, paper, jewelry, water and soil purification materials, weed control materials, cultivation materials, textiles, clothing, biodegradable plastics, body products, health food and biofuel.

Without being bound by any theory, it is believed that keeping the *cannabis* plant under light (e.g., 1000 w metal halides (MH)) during the veg state for above 13 hours and up as needed (e.g., a constant (MH) light source for 24 hours a day), daily to encourage growth (e.g., a constant beyond 2 feet and above (e.g., eight 8-10 feet) and providing ample space for root growth with larger pots (e.g., 1 plant per 25-gallon pot), allows the plant to maximize its potential growth without flowering. This approach can result in *cannabis* with the potency to not only induce a psychoactive cerebral high and euphoria in recreational users but to also result in better treatment methods for which *cannabis* is known in the art, as disclosed above. The potency of *cannabis* is influenced by the size of the plants before the flowering stage. A larger and more robust plant prior to flowering will produce *cannabis* flowers with a very strong psychoactive cerebral high compared to those from smaller or weaker plants that was flowered when it was small in size. To produce *cannabis* flowers with potency to induce psychoactive effects and euphoria, the *cannabis* plant should be strong and robust before entering the flowering stage.

The strength of the psychoactive potency in *cannabis* and the duration it can last can be categorized. The smaller the *cannabis* plant is, or the pot it is in that is developed and grown according to the described method here before flowering, the lesser the strength of psychoactive potency to induce cerebral high and euphoria from the *cannabis* obtained will be. Strength and the duration of the psychoactive potency and euphoria can last when using the obtained *cannabis* can be controlled using the plant size before flowering and pot size it is in when developed and grown according to the methods described herein. This way the consumers get an option for different potency strengths. Some users may not be able to tolerate the extreme potency, we can flower the plants that are cloned and grown according to the methods described here a little early, when it's about 5-6 feet tall to obtain medium strength potency. This hold true also when using a smaller pot than 25-gallons. The method of cultivation and the method of starter plant development described herein are the key to producing *cannabis* that is potent to induce psychoactive cerebral high and euphoria in users.

EXPERIMENTS

I. Comparative Example 1

Methods. Tissue cultured *Cannabis* plants from *Cannabis sativa* L. or Indica strains are propagated from tissue cultured *Cannabis* cells. The propagated *cannabis* plants will undergo maturation before entering the flowering stage. To induce maturation and prevent flowering, the plants, which are placed in 25-gallon flower-pots, are exposed to a 1000 w (MH) light according to a first light schedule of 16-17 hours per day for a duration 12-16 weeks until the plants reach a height of between 8-10 feet. Under this light source and schedule, the plants will remain in the vegetative state. The plants are planted in 25-gallon pots with a single *cannabis* plant per pot for the cultivation. After the plants have reached the appropriate height (i.e., 8-10 feet), the plants are induced to flower by switching the plants to a second light schedule which is 12 hours or less light (i.e., a 12/12 or less schedule) using 1000 w (HPS) bulbs. Starter plants for cultivation are grown from non-GMO seeds or cloned according to the methods described herein.

(i) Analysis of THC content: The THC from the *cannabis* flowers of cultivated *cannabis* plants using the method described herein is compared to the THC from the *cannabis* commonly found in the market. The *Cannabis* plants cultured according to the method above will not necessarily show greater THC % concentration but will have the optimal potency to induce a cerebral psychoactive cerebral high and euphoria.

(ii) Analysis of Euphoric Cerebral High: *Cannabis* plants matured according to the methods are harvested. During the first session a group of subjects are given harvested *cannabis* that is grown according the methods described herein to smoke (This session could last for few days because when *cannabis* with extreme potency is administered to the group for the first time, it will be too strong for them. They will experience a head spinning feeling and be wanting to lay down which is totally normal. They will need to use it a few times for a few days to develop the tolerance to enjoy the psychoactive cerebral high and euphoria properly). For the second session the same group of subjects are administered/provided *cannabis* extracts of highly potent *cannabis* produced using the maturation method as described herein without the THC (the THC is removed). Typical euphoric effects such as the smokers high is assessed using questioners. And for the third session, the same questioners are given to the same group of subjects who have been administered commercial *Cannabis* preparation, which is not grown according to the method.

We expect to see that the subjects who are administered/given harvested *Cannabis* from plants developed and grown according to the method described here to smoke will experience/feel the highest level of actual psychoactive cerebral high and euphoria. In addition, we do not expect any negative side effects such as paranoia, anxiety and panic attacks. High THC percentage on the label looks attractive to consumers, but it does not tell the full story. In fact, research shows that people get the same counterproductive side effects (which are mislabeled or mispresented as high) off *cannabis* flower with moderate levels of THC as they do when they smoke a *cannabis* strain with high levels of THC that is currently available in the market. (See "Does THC Percentage Matter? *Cannabis* Experts Weight in", Oct. 25, 2023 found at https://www.lowtemp-plates.com/blogs/knowledge/does-thc-percentage-matter).

With all being said about THC we believe that the THC from the *cannabis* obtained from a plant which is cloned and grown according to the method described herein will have the actual potency to induce the psychoactive cerebral high and euphoria in the users compared to the THC from the *cannabis* that is available in the market, because the weak THC is coming from the *cannabis* obtained from the plant that was flowered too young and/or cloned wrong.

iii. Analysis of Medicinal Effectiveness/Potency: Participants or subject in need of treatment for conditions for which *cannabis* has been used as a method of treatment will be administered three different types of *cannabis* during separate sessions. On the initial day the participants/subjects will receive the THC-removed potent *cannabis* extracts from the plants that are developed and cultivated using the method described herein. Following this during the next session, the same group will be given/provided the potent *cannabis* with THC from our specially grown *cannabis* plants according to the method described (this session could last for few days because when *cannabis* with extreme potency is administered to the group for the first time, it will be too strong for them. They will experience a head spinning feeling and be wanting to lay down which is totally normal. They will need to use it a few times for a few days to develop the tolerance to enjoy the psychoactive cerebral high and euphoria properly). And on the final day, the participants will be provided with *cannabis* available in the market for comparison purposes. Again, we expect to see that the subjects who are administered/given harvested *Cannabis* from plants grown according to the methods described to experience actual psychoactive cerebral high and euphoria along with all the benefits and relief users are supposed to achieve for medical purposes without the counterproductive side effects. In addition, we don't expect any negative side effects such as paranoia, anxiety and panic attacks either. The responses are documented and assessed using questioners. The same questioners are given to the participants during all three sessions for to record their experiences and response to them. Some sessions could be few days long when *cannabis* grown according to our methods are administrated.

The invention claimed is:

1. A method of maturing a *cannabis* plant comprising:

(a) propagating the *cannabis* plant during a propagation phase;

(b) growing the *cannabis* plant during a growth or vegetative stage using a light source according to a first light schedule for an extended duration of time in a container which is at least 15 gallons until the plant has reached a specified height of at least 6 feet, wherein flowering of the *cannabis* plant is actively prevented during the growth or vegetative stage; and (c) after the *cannabis* plant has reached the specified height of at least 6 feet, inducing the *cannabis* plant to enter a flowering stage by switching to a second light schedule; and (d) harvesting said *cannabis* plant, said harvested *cannabis* from the plant exhibiting actual psychoactive potency to induce cerebral psychoactive high and euphoria with reduced or no counterproductive side effects compared to *cannabis* obtained from the *cannabis* plant which is not developed or matured according to the method before flowering.

2. The method of growing a *cannabis* plant according to claim 1, wherein the specified height is from 8-10 feet in step (b) prior to inducing the plant to enter in the flowering stage in step (c).

3. The method of growing a *cannabis* plant according to claim 1, wherein the duration of time during the growth or vegetative stage in step (b) is 12-16 weeks prior to inducing the plant to enter the flowering stage in step (c).

4. The method of growing a *cannabis* plant according to claim 1, wherein the duration of time during the vegetative stage is 12-14 weeks prior to switching to the flowering state in step (c).

5. The method of growing a *cannabis* plant according to claim 1, wherein the first light schedule during the growth or vegetative stage in step (b) is 16-24 hours daily.

6. The method of growing a *cannabis* plant according to claim 5, wherein the first light schedule during the growth or vegetative stage in step (b) is 16-24 hours and the second light stage during the flowering stage in step (c) is 12 hours or less.

7. The method of growing a *cannabis* plant according to claim 1, wherein the light source in step (b) is a 1000 w metal halide (MH) lamp or bulb and a light source used for providing light for the second light schedule during the flowering stage of step (c) is a 1000 w high-pressure sodium (HPS) light or bulb and lighting intensity is adjusted using an adjustable ballast to lower the light output when the plants are younger.

8. The method of growing a *cannabis* plant according to claim 7, wherein the light intensity schedule starts at less than 500 w and increases to 1000 w.

9. The method of growing a *cannabis* plant according to claim 1, wherein the *cannabis* plant is grown in a 25-gallon container during the growth or vegetative stage of step (b).

10. The method of growing a *cannabis* plant according to claim 1, wherein the *cannabis* plant is grown in a 3-gallon container prior to switching the plant to a 25-gallon container during the growth or vegetative stage of step (b).

11. The method of growing a *cannabis* plant according to claim 1, wherein during the growth or vegetative stage of step (b), the *cannabis* plant is (i) grown in a 3-gallon starting container prior to switching the plant to (ii) growth in a 10-gallon container and then (iii) switching the plant in a 25-gallon for the remainder of the duration of time for the vegetative stage in step (b).

12. The method of growing a *cannabis* plant according to claim 1, wherein a source of the *cannabis* plant for the propagation stage of step (a) is a mother plant which is kept without flowering, the mother plant grown from a non-genetically modified (non-GMO) seed and the mother plant has itself matured to a specified height without flowering according to step (b).

13. The method of growing a *cannabis* plant according to claim 12, wherein clipping for clones are acquired from the same mother plant that is kept without flowering for about 5 batches, and then replacing the mother plant to obtain additional clipping for clones in order to prevent the reduction in psychoactive potency with the *cannabis* obtained from the plant after the first 5 batches of cultivation.

14. The method of growing a *cannabis* plant according to claim 12, wherein the specified height for the mother plant is 8-10 feet.

15. The method of growing a *cannabis* plant according to claim 1, wherein the induction of the *cannabis* plant to enter the flowering stage in step (c) includes starving the plant of water.

16. The method of growing a *cannabis* plant according to claim 1, wherein the *cannabis* plant is cultivated hydroponically.

17. A method of maturing a *cannabis* plant comprising:

(a) propagating the *cannabis* plant during a propagation phase;

(b) growing the *cannabis* plant during a growth or vegetative stage for 12-16 weeks prior to inducing the plant to flower in a container which is at least 3 gallons and then moving the plant to a larger container to reach the height of at least 6 feet;

(c) inducing the *cannabis* plant to flower; and (d) harvesting the *cannabis* plant, said harvested *cannabis* plant exhibiting actual psychoactive potency to induce cerebral psychoactive high and euphoria with reduced or no counterproductive side effects compared to *cannabis* from the plant which is not developed and matured according to the method before flowering, as a result of the *cannabis* plant being maintained in the non-flowering vegetative stage until reaching the height of at least 6 feet prior to flowering.

18. The method of growing a *cannabis* plant according to claim 17, wherein the source of the *cannabis* plant for the propagation stage of step (a) is a mother plant which is kept without flowering, the mother plant grown from a non-genetically modified (non-GMO) seed and the mother plant which has itself matured to a specified height without flowering according to step (b).

19. A method of maturing a *cannabis* plant comprising:

(a) propagating the *cannabis* plant during a propagation phase;

(b) growing the *cannabis* plant during a growth or vegetative stage until the plant has reached a height of greater than 3 feet in a container which is of sufficient size to allow for strong and extended root growth;

(c) stressing the *cannabis* plant by toping the plant to prevent the plant from growing straight up;

(d) inducing the *cannabis* plant to flower; and (e) harvesting the *cannabis* plant, said harvested *cannabis* from the plant exhibiting actual psychoactive potency to induce cerebral psychoactive high and euphoria with reduced or no counterproductive side effects compared to a *cannabis* plant which is not developed and matured according to the method before flowering.

20. The method of claim 19, wherein the container in step (b) is a 25 gallon pot.

* * * * *